(12) United States Patent
Funabashi et al.

(10) Patent No.: US 9,985,854 B2
(45) Date of Patent: May 29, 2018

(54) COMMUNICATION SYSTEM AND COMMUNICATION APPARATUS

(71) Applicant: DENSO CORPORATION, Kariya, Aichi-pref. (JP)

(72) Inventors: Junichiro Funabashi, Nagoya (JP); Toshiyuki Ito, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 481 days.

(21) Appl. No.: 14/658,570

(22) Filed: Mar. 16, 2015

(65) Prior Publication Data

US 2015/0281023 A1    Oct. 1, 2015

(30) Foreign Application Priority Data

Mar. 28, 2014    (JP) .................. 2014-069763

(51) Int. Cl.
  *G01R 31/08*    (2006.01)
  *H04L 12/26*    (2006.01)
  *H04W 4/04*     (2009.01)

(52) U.S. Cl.
  CPC ......... *H04L 43/0817* (2013.01); *H04W 4/046* (2013.01); *H04L 43/0882* (2013.01)

(58) Field of Classification Search
  CPC .................. H04L 43/0817; H04L 43/0882
  See application file for complete search history.

(56) References Cited

U.S. PATENT DOCUMENTS 4,550,402 A  *  10/1985  Gable ................. H04L 29/00
                                           370/438

5,768,688 A    6/1998  Owada
(Continued)

FOREIGN PATENT DOCUMENTS

JP    H08-331227    12/1996
JP    2007-228480    9/2007
(Continued)

OTHER PUBLICATIONS

Office Action dated Jan. 26, 2016 in corresponding Japanese Application No. 2014-069763 with English translation.

*Primary Examiner* — Robert Wilson
(74) *Attorney, Agent, or Firm* — Harness, Dickey & Pierce, P.L.C.

(57) ABSTRACT

A communication system including a first communication apparatus and a second communication apparatus is provided. The first communication apparatus includes a communication portion. The second communication apparatus includes a communication portion. The first communication apparatus includes a first transmission portion. The first transmission portion transmits a first signal to another communication apparatus. The first signal at least includes information enabling to specify the first communication apparatus. The second communication apparatus includes a second transmission portion. The second transmission portion transmits a second signal to the first communication apparatus. The first communication apparatus includes a malfunction determination portion. The malfunction determination portion determines whether the communication portion of the first communication apparatus is out of order. The communication system includes a congestion determination portion. At least one of the first signal and the second signal is transmitted.

15 Claims, 15 Drawing Sheets

(56) References Cited

U.S. PATENT DOCUMENTS

| | | | | |
|---|---|---|---|---|
| 6,426,944 | B1* | 7/2002 | Moore | H04L 47/10 370/236 |
| 8,325,602 | B2* | 12/2012 | Rivers | H04L 47/10 370/230 |
| 9,084,198 | B2* | 7/2015 | Sakata | H04W 52/04 |
| 2007/0081454 | A1* | 4/2007 | Bergamasco | H04L 47/10 370/229 |
| 2011/0032818 | A1* | 2/2011 | Yamaguchi | H04L 45/02 370/225 |
| 2012/0323690 | A1* | 12/2012 | Michael | G06Q 30/02 705/14.58 |
| 2013/0156017 | A1 | 6/2013 | Hori et al. | |
| 2013/0210478 | A1 | 8/2013 | Sakata et al. | |
| 2014/0004894 | A1* | 1/2014 | Yamamoto | H04W 52/282 455/500 |
| 2014/0309864 | A1* | 10/2014 | Ricci | H04W 48/04 701/36 |
| 2015/0281023 | A1* | 10/2015 | Funabashi | H04L 43/0817 370/242 |
| 2016/0057561 | A1* | 2/2016 | Kami | H04W 24/10 370/329 |

FOREIGN PATENT DOCUMENTS

| | | |
|---|---|---|
| JP | 2007-329667 | 12/2007 |
| JP | 2009-093343 | 4/2009 |
| JP | 2010-134865 | 6/2010 |
| JP | 2012-070091 | 4/2012 |
| JP | 2013-138464 | 7/2013 |
| WO | WO2012/124685 | 9/2012 |

\* cited by examiner (NUMBER OF RECEIVED PACKETS IN UNIT TIME) ≥ (THRESHOLD VALUE Th_n)
→ DETERMINE AS CONGESTION CHANNEL USAGE RATE (%) = ($\Sigma$ ti/T0) × 100

CHANNEL USAGE RATE ≥ (THRESHOLD VALUE Th_t)
→ DETERMINE AS CONGESTION

COMMUNICATION SYSTEM AND COMMUNICATION APPARATUS

CROSS REFERENCE TO RELATED APPLICATION

This application is based on Japanese Patent Application No. 2014-69763 filed on Mar. 28, 2014, the disclosure of which is incorporated herein by reference.

TECHNICAL FIELD

The present disclosure relates to a communication system and a communication apparatus. The communication system includes a first communication apparatus and a second communication apparatus having a communication portion that enables to perform wireless communication such as a vehicle-vehicle communication and a road-vehicle communication.

BACKGROUND ART

Patent literature 1: JP2009-93343A

Recently, a technology by which information with respect to a travelling condition of an vehicle outside a subject vehicle or a road situation is obtained using a vehicle-vehicle communication or a road-vehicle communication is proposed (for example, referring to patent literature 1).

For confirming whether a communication apparatus provided to a subject vehicle correctly outputs a radio wave or for confirming whether a transmission function is correctly performed, a method by which it is determined that the communication apparatus of the subject vehicle functions correctly when the communication apparatus broadcasts a response request to a surrounding communication apparatus and the communication apparatus receives a response from the surrounding communication apparatus is known.

The inventors of the present application have found the following. When the above method may be performed in a vehicle-vehicle communication, a lot of responses may occur and a communication to be originally performed may be prevented according to density of surrounding communication apparatus.

SUMMARY

It is an object of the present disclosure to provide a communication system that enables to perform a malfunction diagnosis while suppressing obstruction of transmission and reception of other information and to provide a communication apparatus configuring the communication system.

According to one aspect of the present disclosure, a communication system includes a first communication apparatus and a second communication apparatus. The first communication apparatus includes a communication portion that enables to perform wireless communication. The second communication apparatus includes a communication portion that enables to perform wireless communication. The first communication apparatus includes a first transmission portion. The first transmission portion transmits a first signal to another communication apparatus. The first signal at least includes information enabling to specify the first communication apparatus. The second communication apparatus that corresponds to the other communication apparatus receiving the first signal includes a second transmission portion. The second transmission portion transmits a second signal to the first communication apparatus when the second communication apparatus receives the first signal. The first communication apparatus includes a malfunction determination portion. The malfunction determination portion determines whether the communication portion of the first communication apparatus is out of order according to a reception status of the second signal. The communication system includes a congestion determination portion determining a congestion degree of communication in at least one of the communication portion of the first communication apparatus and the communication portion of the second communication apparatus. At least one of the first signal by the first transmission portion and the second signal by the second transmission portion is transmitted when the congestion determination portion determines that the congestion degree is equal to or less than a predetermined threshold.

According to another aspect of the present disclosure, a communication apparatus having a function of the first communication apparatus or the second communication apparatus of the communication system is provided.

According to the communication system and the communication apparatus, a communication is performed for a malfunction determination when the congestion degree of communication is equal to or less than a predetermined threshold. Therefore, it may be possible to suppress obstruction of transmission and reception of other information.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1A:
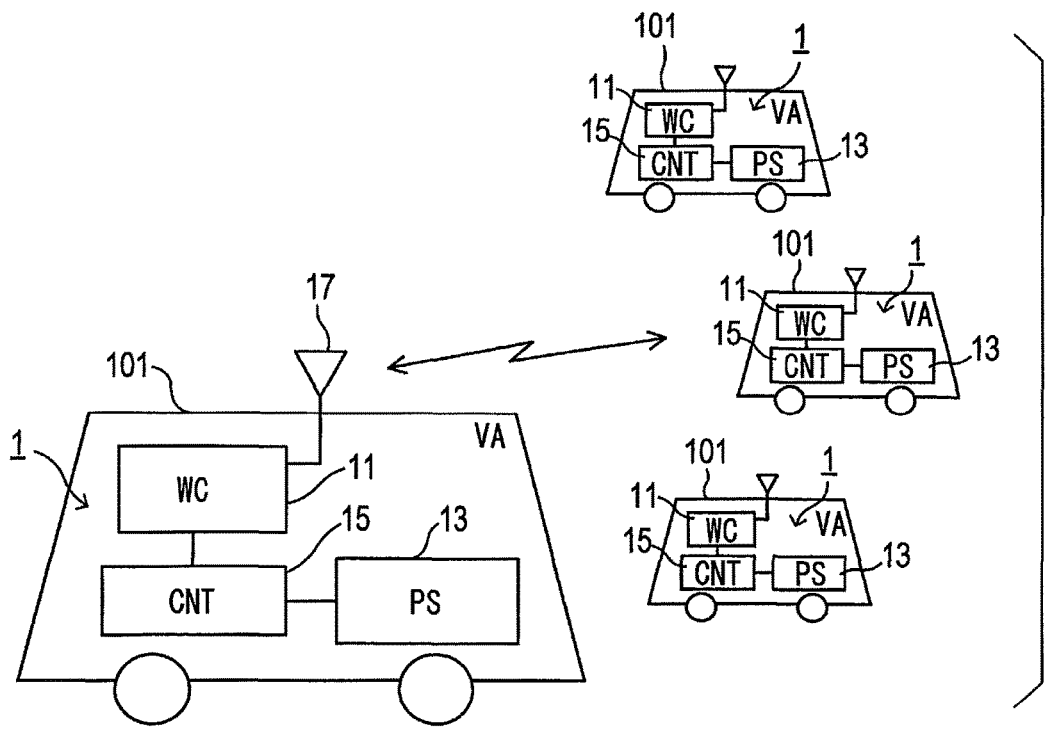
FIG. 1A is a block diagram illustrating a schematic configuration of a communication system in a first embodiment.

Embodiments of the present disclosure will be explained with referring to the drawings. Incidentally, it should be noted that the present disclosure is not limited to the following embodiments and the present disclosure includes various modification within a technical scope of the present disclosure.

First Embodiment (1) Configuration

A communication system in the present embodiment is configured from multiple in-vehicle apparatuses 1. The communication system executes a malfunction diagnosis regarding a communication function according to a congestion degree of communication. The in-vehicle apparatus 1 corresponds to a first communication apparatus and a second communication apparatus in the present disclosure. The congestion degree represents a degree of a communication load and represents a value indicating network traffic.

Figure 1B:
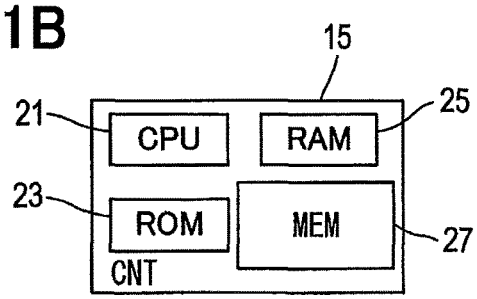
FIG. 1B is a block diagram illustrating a schematic configuration of a control device in the communication system in the first embodiment.

The in-vehicle apparatus 1 is provided to a vehicle 101 as described in FIG. 1A and FIG. 1B. The in-vehicle apparatus 1 executes the malfunction diagnosis of a communication function in multiple in-vehicle apparatuses 1. Incidentally, the in-vehicle apparatus 1 may also be referred to as a terminal, simply. In addition, a subject terminal corresponds to the in-vehicle apparatus 1 that performs a certain processing as a main body. A transmission source terminal corresponds to the in-vehicle apparatus 1 that transmits a certain data (also referred to as a packet). A transmission destination terminal corresponds to the in-vehicle apparatus 1 to which a certain data is transmitted (in other words, the transmission destination terminal receives a certain data). The transmission source terminal corresponds to the in-vehicle apparatus 1 of a transmission source, and the transmission destination terminal corresponds to the in-vehicle apparatus 1 of a transmission destination.

The in-vehicle apparatus 1 includes wireless communication device 11, a position specification device 13, and a control device 15.

The wireless communication device 11 enables to perform a vehicle-vehicle communication and periodically wirelessly transmits a packet signal to another terminal through an antenna 17 of a vehicle having the subject terminal. The control device 15 in the in-vehicle apparatus 1 generates the packet signal. Another terminal also corresponds to an in-vehicle apparatus 1 and not limited to one. That is, another terminal may be one or more. Another terminal exists in a communication area corresponding to the surrounding of the subject terminal (the in-vehicle apparatus 1) and receives a radio wave transmitted from the subject terminal. In the present embodiments, the subject terminal and another terminal have a configuration, and the wireless communication device 11 of the subject terminal enables to receive a packet signal from another terminal. Herein, another terminal may also be referred to as a second terminal.

The position specification device 13 receives a signal (corresponding to a GPS signal) from a satellite for GPS (global positioning system) through a not-shown GPS antenna and specifies a position of the in-vehicle apparatus 1. Incidentally, the GPS is an example of a satellite that enables to specify a position. The GPS signal includes time information, and the in-vehicle apparatus 1 obtains time information from the GPS signal. The position specification device 13 may be an example of a position specification portion in the present disclosure.

The control device 15 is basically configured from a well-known computer including a CPU 21, a ROM 23, a RAM 25, a non-volatile memory 27, a not-shown I/O, a bus line connecting these components, or the like. The CPU 21 integrally controls the in-vehicle apparatus 1 according to a program or the like stored in the ROM 23 or the non-volatile memory 27. The CPU 21 corresponds to an example of a first transmission portion, a second transmission portion, a malfunction determination portion, and a congestion determination portion in the present disclosure.

A storage region of the non-volatile memory 27 includes a failure counter. The failure counter is a counter that is counted up when a communication condition is poor. It is determined that the wireless communication device 11 is out of order when the failure counter exceeds a predetermined value.

Information other than the failure counter is stored by a processing by the CPU 21. The Information is stored to the RAM 25 or the non-volatile memory 27. Hereinafter, either or both of the RAM 25 and the non-volatile memory 27 may be referred to a memory simply.

(2) State Transition in Diagnosis

Figure 2:
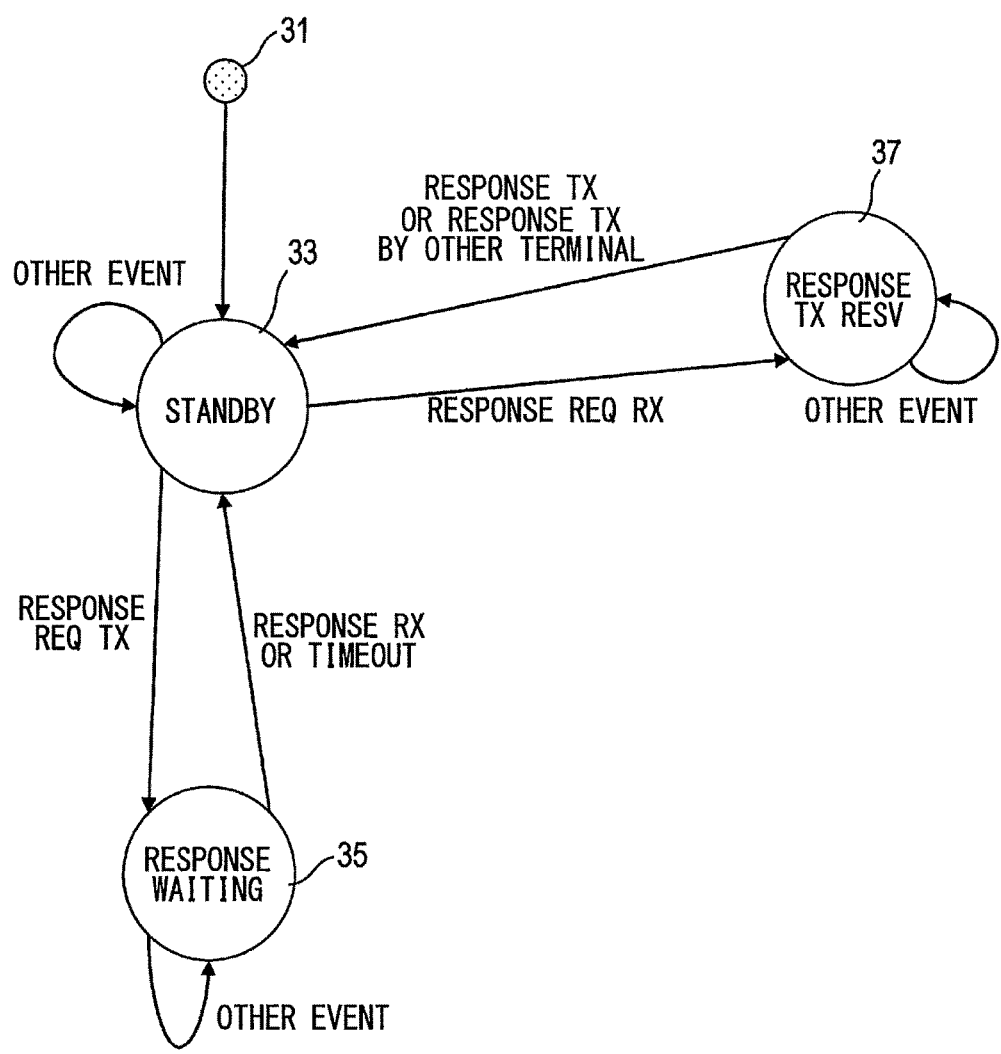
FIG. 2 is a drawing illustrating a state transition in a diagnosis in the first embodiment.

The in-vehicle apparatus 1 in the present embodiment performs a transition as described in FIG. 2 in order to perform a malfunction diagnosis of a radio function (corresponding to the malfunction diagnosis of the wireless communication device 11). The in-vehicle apparatus 1 initially transits from an initial state 31 to a standby state 33. In order to perform the malfunction diagnosis of a subject terminal (the in-vehicle apparatus 1), the in-vehicle apparatus 1 transmits a response request to another terminal, and changes to a response waiting state 35. When the in-vehicle apparatus 1 receives a response (also referred to as acknowledge) from another terminal or does not receive a response within a fixed period (that is, a timeout), the in-vehicle apparatus 1 changes to the standby state 33. A situation of the states may be managed by setting a flag on the memory, for example.

The subject terminal may correspond to a first communication apparatus, and another terminal may correspond to a second communication apparatus.

When another terminal transmits a response request to the subject terminal in order to perform the malfunction diagnosis of another terminal and the subject terminal receives the response request, the subject terminal changes to a response transmission reservation state 37. When the subject terminal performs the response transmission or a third terminal other than another terminal transmitting the response request and the subject terminal performs the response transmission, the subject terminal changes to the standby state 33.

Incidentally, any events other than the malfunction diagnosis may be performed without being affected from the states in any of the standby state 33, the response waiting state 35, and the response transmission reservation state 37.

(3) Processing by CPU 21 in Control Device 15

(3-1) Transmission Processing

Figure 3:
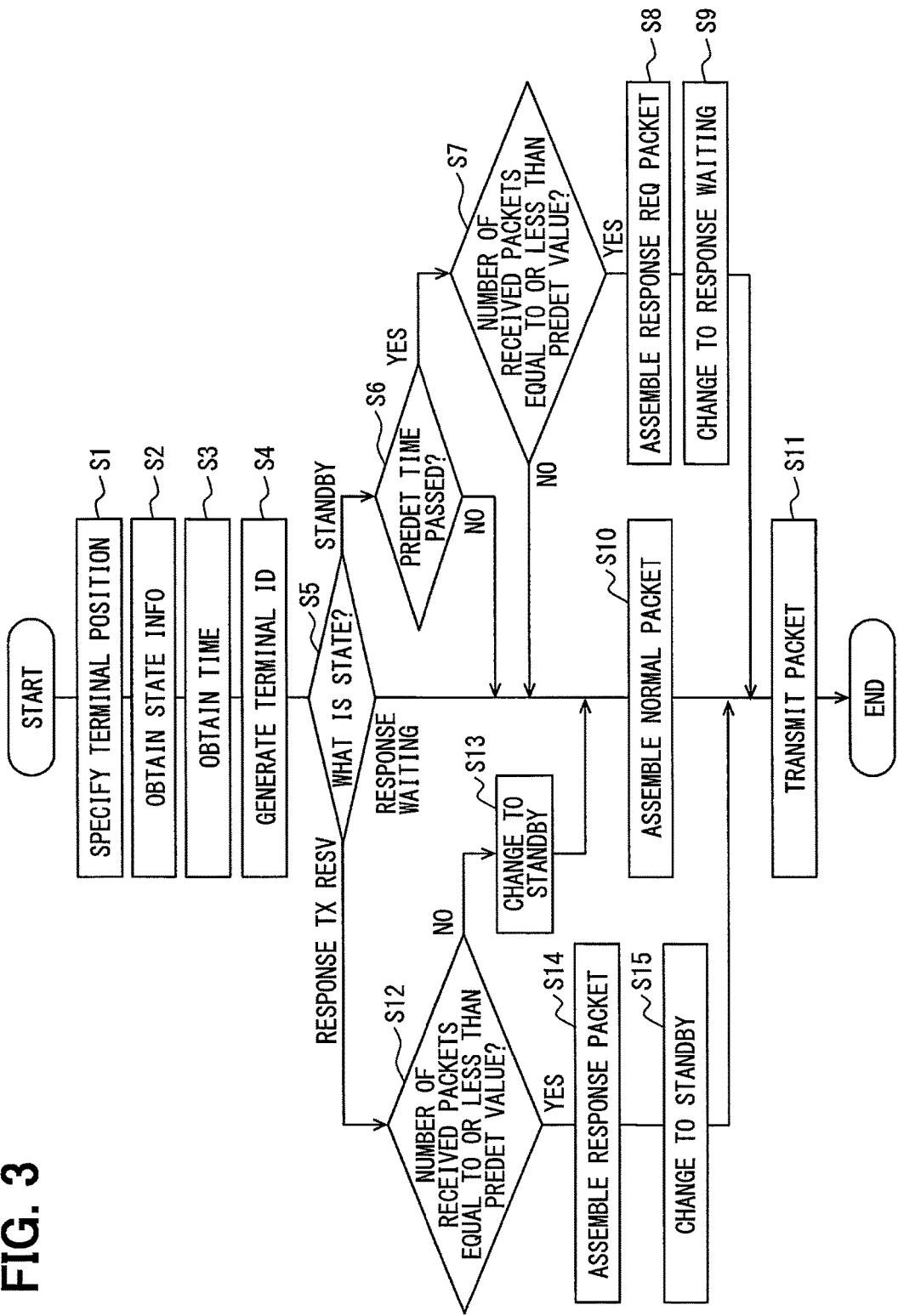
FIG. 3 is a flowchart illustrating a transmission processing in the first embodiment.

A transmission processing that the CPU 21 in the control device 15 performs will be explained based on a flowchart illustrated in FIG. 3. The transmission processing is repeatedly executed at a predetermined time intervals (for example, 100 milliseconds).

(Processing at the Time of Initiation of Transmission Processing)

A processing of S1 to S5 is executed when the transmission processing is initiated.

At S1, the CPU 21 specifies a position of the subject terminal (the in-vehicle apparatus 1) by the position specification device 13.

At S2, the CPU 21 obtains state information of a vehicle having the subject terminal. Incidentally, the state information corresponds to various information obtained from, for example, a vehicular CAN. The state information may correspond to information representing an operation to a brake or a blinker, an operation state of the brake or the blinker, a vehicle speed, for example.

At S3, the CPU 21 obtains time from a real time clock, which is synchronized with time of the GPS satellite, for example.

At S4, the CPU 21 generates a terminal ID. It may be possible to improve a privacy protection function by updating the terminal ID periodically.

At S5, the CPU 21 determines the diagnostic state of the in-vehicle apparatus 1. As explained in FIG. 2, the diagnostic state may be the "standby", the "response waiting" or, the "response transmission reservation". The standby corresponds to a state other than a state where the in-vehicle apparatus 1 requires a diagnosis and the in-vehicle apparatus 1 is required for the diagnosis. The response waiting corresponds to a state where the in-vehicle apparatus 1 requests a diagnosis by another in-vehicle apparatus 1 (another terminal). The response transmission reservation corresponds to a state where the in-vehicle apparatus 1 is requested for the diagnosis from another in-vehicle apparatus 1. In the following, each state will be explained.

(Transmission Processing in Standby)

The processing shifts to S6 when it is determined as the standby at S5.

At S6, the CPU 21 determines whether a predetermined time elapses after a previous diagnosis. A time of the previous diagnosis may correspond to, for example, a time (corresponding to a time a response request packet assembled at S8 is transmitted at S11) when a response request packet is transmitted, a time (corresponding to a time it is determined as YES at S37) when a response packet is received, a time (corresponding to a time when a processing of S28 or S38 is executed) when a failure counter is updated, etc. The predetermined time may be a relatively long time such as one week, one month, for example.

When the predetermined time elapses at S6 (S6: YES), the processing shifts to S7. When the predetermined time does not elapse (S6: NO), the processing shifts to S10.

At S7, the CPU 21 determines whether the number of the received packets in a past fixed period is equal to or less than a predetermined value. The processing of S7 determines that vehicles with an apparatus that performs vehicle-vehicle communication such as the in-vehicle apparatus 1 are a few and a congestion degree of communication is not excessive. That is, the number of the received packets corresponds to a parameter of the congestion degree.

The number of the received packets in the past fixed period is counted in a reception processing of S22. The fixed period may be 30 seconds, for example.

When the number of the received packets in the past fixed period is equal to or less than a predetermined value (S7: YES), the processing shifts to S8. When the number of the received packets in the past fixed period is more than the predetermined value (S7: NO), the processing shifts to S10.

The CPU 21 assembles the response request packet at S8. A message in the response request packet includes a transmission source terminal ID corresponding to the terminal ID generated at S4, the positional information regarding the position specified at S1, the state information obtained at S2, or the like. After S8, the processing shifts to S9.

The CPU 21 changes the diagnostic state of the in-vehicle apparatus 1 to the response waiting at S9. After S9, the processing shifts to S11.

At S10, the CPU 21 assembles a normal packet. The normal packet is different from the response request packet. A message of the normal packet includes the transmission source terminal ID, the positional information, the state information, or the like, similar to the response request packet. After S10, the processing shifts to S11.

At S11, the CPU 21 transmits a generated packet to a portion outside the in-vehicle apparatus 1 by broadcast communication. After S11, the transmission processing ends.

(Transmission Processing in Response Waiting)

When it is determined as the response waiting at S5, the CPU 21 assembles the normal packet at S10 and transmits the normal packet to the outside portion at S11.

(Transmission Processing in Response Transmission Reservation)

The processing shifts to S12 when it is determined as the response transmission reservation at S5.

At S12, the CPU 21 determines whether the number of the received packets in the past fixed period is equal to or less than a predetermined value. When the number of the received packets in the past fixed period is not equal to or less than the predetermined value (S12: NO), the processing shifts to S13. When the number of the received packets in the past fixed period is equal to or less than the predetermined value (S12: YES), the processing shifts to S14.

The CPU 21 transits the diagnostic state of the in-vehicle apparatus 1 to the standby at S13. After S13, the processing shifts to S10. The CPU 21 assembles the normal packet and transmits to the outside portion.

The CPU 21 assembles the response packet at S14. The response packet is different from the normal packet and the response request packet. A message in the response packet includes the transmission source terminal ID corresponding to the terminal ID generated at S4, a transmission destination terminal ID (corresponding to a terminal ID of a transmission source of a response request) stored in the memory at S33, the positional information of the position specified at S1, the state information obtained at S2, or the like. After S14, the processing shifts to S15.

The CPU 21 transits the diagnostic state of the in-vehicle apparatus 1 to the standby at S15. After S15, the processing shifts to S11.

(3-2) Reception Processing

Figure 4:
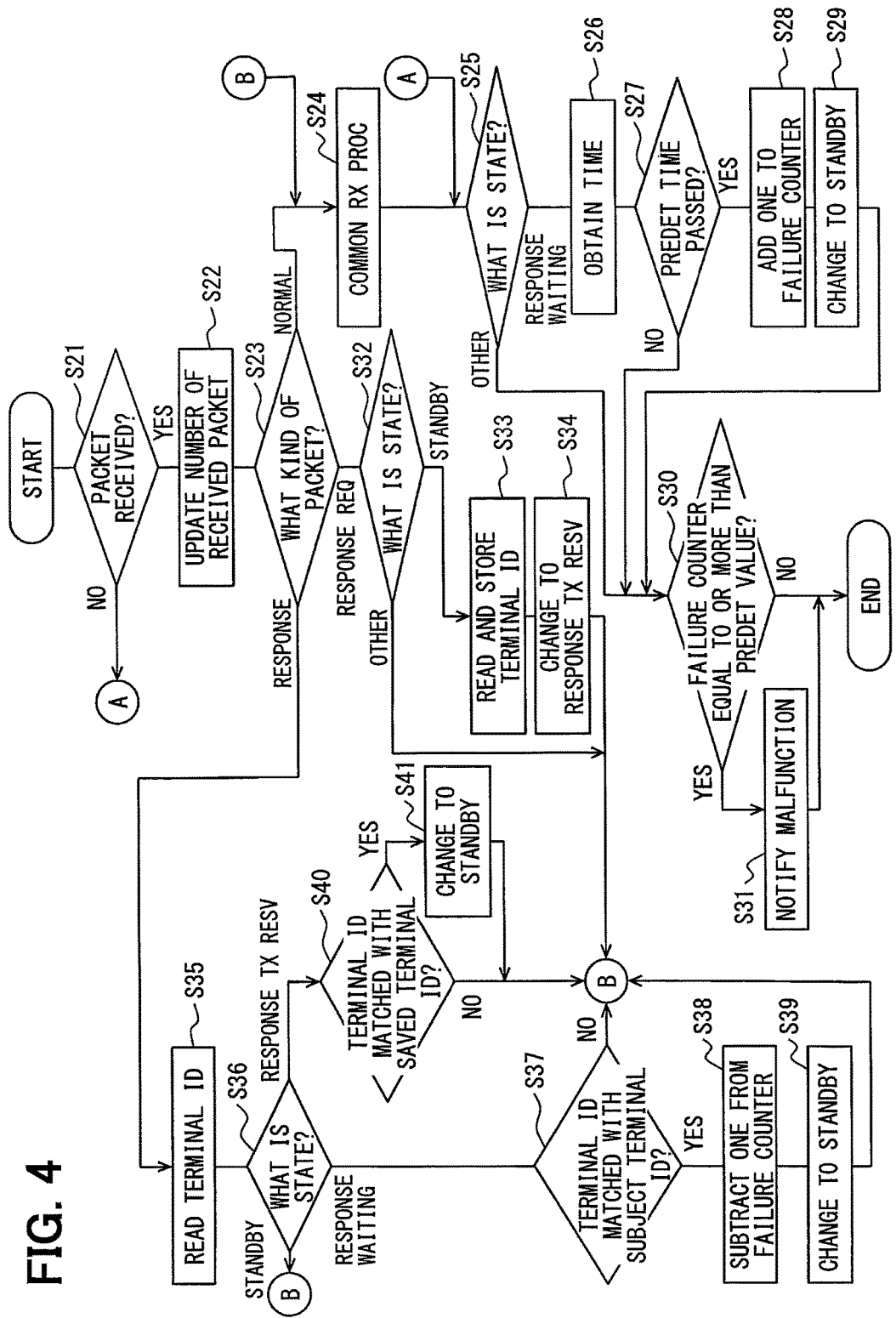
FIG. 4 is a flowchart illustrating a reception processing in the first embodiment.

A reception processing that the CPU 21 of the control device 15 performs will be explained based on a flowchart illustrated in FIG. 4. The reception processing is performed when a predetermined event occurs. The predetermined event includes a case (corresponding to a timer termination of 1 second, as an example) where a timer counting from a previous initiation of the reception processing is terminated, a case where a wireless packet is received, or the like.

(Processing at the Time of Initiation of Reception Processing)

A processing of S21 to S23 is initially executed when the reception processing is initiated.

At S21, the CPU 21 determines whether a packet is received by wireless communication. When the CPU 21 has received the packet (S21: YES), the processing shifts to S22. When the CPU 21 has not received the packet (S21: NO), the processing shifts to S25.

At S22, the CPU 21 updates the number of the received packets in a past fixed period. After S22, the processing shifts to S23.

At S23, the CPU 21 determines a kind of the packet which the CPU 21 has determined as reception at S21. The kind of the packet corresponds to either of the normal packet, the response request packet, and the response packet. Incidentally, the normal packet is described as "normal", the response request packet is described as "response", and the response packet is described as "response" in the drawings. Each case will be explained.

Incidentally, a processing at the time when the CPU 21 has received the normal packet is also executed when the CPU 21 receives the response request packet or the response packet. When the CPU 21 has received the response request packet or the response packet, a predetermined processing is initially executed and then a processing similar to a processing at the time the CPU 21 has received the normal packet is executed.

(Processing at the Time of Reception of Normal Packet)

The processing shifts to S24 when it is determined as the normal packet at S23.

At S24, the CPU 21 initiates a common reception processing. In the processing of S24, a control with respect to a travelling of a vehicle, information notification to an occupant or the like is executed based on positional information and status information of the vehicle included in the received packet. For example, the control with respect to the travelling of the vehicle may be a control for preventing a collision with an vehicle. The information notification may be notification of a traffic situation of the surrounding of the vehicle. After initiating the common reception processing, the processing shifts to S25.

The CPU 21 determines the diagnostic state of the in-vehicle apparatus 1 at S25. At S25, it is determined whether the diagnostic state corresponds to the response waiting. When the diagnostic state corresponds to the response waiting, the processing shifts to S26. When the diagnostic state does not correspond to the response waiting, the processing shifts to S30. Incidentally, the response waiting corresponding to a state where the response packet has not been received yet after the response request packet assembled at S8 has transmitted at S11.

The CPU 21 obtains time from the signal transmitted from the GPS satellite at S26. After S26, the processing shifts to S27.

At S27, the CPU 21 determines whether a predetermined period elapses in a present state. That is, at S27, the CPU 21 determines whether the predetermined period elapses after the response request packet is transmitted at S11 and the CPU 21 becomes the response waiting state to the present time. The predetermined period may be 1 second, for example. When the predetermined period elapses (S27: YES), the processing shifts to S28. When the predetermined time does not elapse (S27: NO), the processing shifts to S30.

At S28, the CPU 21 adds 1 to the failure counter. After S28, the processing shifts to S29.

The CPU 21 transits the diagnostic state of the in-vehicle apparatus 1 to the standby at S29. After S29, the processing shifts to S30.

At S30, the CPU 21 determines whether the failure counter is equal to or more than a predetermined value. When the failure counter is equal to or more than the predetermined value (S30: YES), the processing shifts to S31. When the failure counter is not equal to or more than the predetermined value (S30: NO), the reception processing ends.

At S31, the CPU 21 determines as a malfunction with respect to the communication function (the wireless communication device 11) and notifies the malfunction to an occupant using a display or a speaker provided to the inside of the vehicle. After S31, the reception processing ends.

(Processing at the Time of Reception of Response Request Packet)

When it is determined as the response request packet at S23, the processing shifts to S32.

The CPU 21 determines the diagnostic state of the in-vehicle apparatus 1 at S32. At S32, it is determined whether the diagnostic state corresponds to the standby. When the diagnostic state corresponds to the standby, the processing shifts to S33. When the diagnostic state does not correspond to the standby, the processing shifts to S24. That is, when the diagnostic state is not the standby, the CPU 21 does not respond even when the CPU 21 receives the response request packet. After S32, the processing shifts to S33.

At S33, the CPU 21 reads the terminal ID from the received response request packet, and saves the terminal ID in the memory. The terminal ID saved at S33 represents the terminal ID of the transmission source that has transmitted the response request packet so that a transmission source terminal performs the malfunction diagnosis. The terminal ID is used as a transmission destination terminal ID, which is included in the response packet at S14. In addition, the terminal ID is also used for preventing a transmission of an overlapped response at S40. After S33, the processing shifts to S34.

The CPU 21 transits the diagnostic state of the in-vehicle apparatus 1 to the response transmission reservation at S34. After S34, the processing shifts to S24.

(Processing at the Time of Reception of Response Packet)

When it is determined as the response packet at S23, the processing shifts to S35.

At S35, the CPU 21 reads the transmission destination terminal ID from the received response packet. The transmission destination terminal ID corresponds to information included by the terminal, which corresponds to the transmission source, and corresponds to a terminal ID of the terminal to which the response packet should be transmitted. After S35, the processing shifts to S36.

At S36, the CPU 21 determines the diagnostic state of the in-vehicle apparatus 1. When the diagnostic state corresponds to the standby, the processing shifts to S24. When the diagnostic state corresponds to the response waiting, the processing shifts to S37. When the diagnostic state corresponds to the response transmission reservation, the processing shifts to S40.

At S37, the CPU 21 determines whether the transmission destination terminal ID read out at S35 is matched with the terminal ID of the subject terminal. The terminal ID of the subject terminal corresponds to the terminal ID generated at S4. When the terminal ID that has read out is matched with the terminal ID of the subject terminal (S37: YES), the processing shifts to S38. When the terminal ID that has read out is not matched with the terminal ID of the subject terminal (S37: NO), the processing shifts to S24.

At S38, the CPU 21 subtracts 1 from the failure counter. When a counter value of the failure counter is equal to or less than zero after subtraction, the counter value is set to zero. After S38, the processing shifts to S39.

The CPU 21 transits the diagnostic state of the in-vehicle apparatus 1 to the standby at S39. After S39, the processing shifts to S24.

At S40, the CPU 21 determines whether the transmission destination terminal ID read out at S35 is matched with the terminal ID stored in the memory at S33. When the terminal ID read out at S35 is matched with the terminal ID stored in the memory (S40: YES), the processing shifts to S41. When the terminal ID read out at S35 is not matched with the terminal ID stored in the memory (S40: NO), the processing shifts to S24.

The CPU 21 transits the diagnostic state of the in-vehicle apparatus 1 to the standby at S41. When it is determined as YES at S40, this case represents that another terminal other than the subject terminal and the terminal specified by the transmission destination terminal ID has transmitted a response packet. Therefore, according to the state transition at S41, the subject terminal does not transmit a response packet and it may be possible to prevent a transmission of an overlapped response packet. After S41, the processing shifts to S24.

(4) Effects

The communication system in the present embodiment includes the in-vehicle apparatus 1. The in-vehicle apparatus 1 includes a wireless communication device 11 (corresponding to a communication portion) that enables to perform a vehicle-vehicle communication and is mounted to a vehicle 101. The in-vehicle apparatus 1 corresponds to a first communication apparatus and a second communication apparatus.

The CPU 21 of the control device 15 in the in-vehicle apparatus 1 (corresponding to a first communication apparatus) transmits the response request packet (corresponding to a first signal and a response request signal) including information (corresponding to a transmission source terminal ID) that enables to specify the in-vehicle apparatus 1 to another in-vehicle apparatus (corresponding to another communication apparatus). Another in-vehicle apparatus is different from the in-vehicle apparatus 1 and exists outside the vehicle 101 (S8, S11).

The CPU 21 of the in-vehicle apparatus 1 (corresponding to a second communication apparatus) that receives the response request packet transmits a response packet (corresponding to a second signal and a response signal) to the in-vehicle apparatus 1 (corresponding to a first communication apparatus) of the transmission source (S14, S11).

The CPU 21 of the first communication apparatus determines whether the wireless communication device 11 provided to the in-vehicle apparatus 1 is out of order according to a reception status of the response packet (S30, S31). More specifically, the CPU 21 determines a malfunction based on a case where the wireless communication device 11 does not receive the response packet at S25 to S28 and a case where the wireless communication device 11 receives the response packet at S35 to S38.

According to the present embodiment, the CPU 21 determines the congestion degree in the wireless communication device 11 (S7, S12) and, when the congestion degree is equal to or less than a predetermined threshold, the CPU 21 transmits the response request packet and the response packet. The congestion degree corresponds to a parameter determined by the number of the received packets in a past fixed period.

According to the communication system in the present embodiment, since a malfunction is determined when the congestion degree of the communication is equal to or less than the predetermined threshold, it may be possible to suppress obstruction of transmission and reception of other information. The other information may correspond to, for example, data for obtaining vehicle status information, which is required for preventing collision of a vehicle 101. In other words, it may be possible to transmit and receive other information such as data for obtaining vehicle status information, which is required for preventing collision of a vehicle.

For example, since the response packet is added with the terminal ID information of the transmission destination terminal (corresponding to the in-vehicle apparatus 1 performing the malfunction diagnosis), communication traffic may increase by the terminal ID information. However, according to the present embodiment, it may be possible to prevent the communication traffic from increasing when the communication is crowded.

In other words, the terminal ID information is not transmitted in a case when the communication is crowded (that is, the normal packed is transmitted) and therefore, the communication traffic does not increase. Strictly speaking, although packet kind information is transmitted, a frame is usually prepared in advance. The communication traffic does not increase due to the packet kind information.

In addition, since the response packet is transmitted only when the response request packet transmitted at each predetermined period is received, it may be possible to prevent the communication traffic for the malfunction diagnosis from increasing at time when the malfunction diagnosis is not required.

In the present embodiment, it is determined that the congestion degree is high as the number of wireless packet received within a predetermined period is larger. Therefore, it may be possible to appropriately determine the congestion degree according to density of the in-vehicle apparatus 1.

Incidentally, according to the present embodiment, the congestion degree is determined and it is determined whether the transmission of the response request packet or the response packet should be performed or not in cases where the response request packet or the response packet is transmitted. The congestion degree may be determined and it may be determined whether a transmission is performed or not in a case where either one of the response request packet and the response packet is transmitted.

According to the present embodiment, the malfunction is determined based on conditions where the response packet is received and the response packet is not received. Alternatively, the malfunction may be determined based on either one of the conditions where the response packet is received and the response packet is not received. For example, a rate of a reception of the response packet to a transmission times of the response request packet, or a rate that the response packet is not received to the transmission times of the response request packet may be counted and the malfunction may be determined based on the counted value.

Second Embodiment

An in-vehicle apparatus 1 in a second embodiment has a hardware configuration similar to the in-vehicle apparatus 1 in the first embodiment. Contents of the processing performed by the control device 15 (especially, the CPU 21) is different from the processing performed in the first embodiment. In the present embodiment, information with respect to a reception of the response packet is not used to determine that a communication function performs normally when the response packet is received and the terminal of the transmission source exists in the vicinity of the subject terminal.

(1) Processing by CPU 21 in Control Device 15

The transmission processing in the second embodiment is similar to the first embodiment. A reception processing will be explained based on a flowchart illustrated in FIG. 5. Incidentally, a processing similar to the flowchart of FIG. 4 will have the identical symbols, the explanation will be omitted, and a processing different from the flowchart of FIG. 4 will be explained.

The CPU 21 reads a transmission source terminal ID from the received response packet at S35, and the processing in the present embodiment shifts to S51.

At S51, the CPU 21 reads positional information representing a terminal position from the received response packet. The positional information represents the position of the terminal of the transmission source, which assembles the response packet. After S51, the processing shifts to S36. The terminal of the transmission source corresponds to an in-vehicle terminal 1.

When the CPU 21 determines at S37 that the transmission destination terminal ID read out at S35 is matched with the terminal ID of the subject terminal (corresponding to a terminal that receives the response packet), the processing shifts to S52.

At S52, the CPU 21 specifies the position of the subject terminal. The processing at S52 is similar to S1 in FIG. 3. After S52, the processing shifts to S53.

At S53, the CPU 21 determines whether a distance between the subject terminal and the transmission source terminal read at S51 is equal or greater than a predetermined value. The predetermined value may be equal to 100 meters, for example. When the distance between the terminals is equal to or more than 100 meters (S53: YES), the processing shifts to S38. When the distance between the terminals is not equal to or more than 100 meters (S53: NO), the processing shifts to S39 instead of S38.

(2) Effects

The communication system in the present embodiment performs a malfunction determination when the congestion degree of communication is equal to or less than a predetermined threshold, similar to the communication system in the first embodiment. Therefore, it may be possible to suppress obstruction of transmission and reception of other information.

In addition, according to the present embodiment, based on the position (S52) specified by the position specification device 13 that specifies the position of the in-vehicle apparatus 1 corresponding to the remission destination terminal of the response packet and an information (S52) representing the position of the in-vehicle apparatus 1 corresponding to the transmission source terminal and being included in the response packet, the distance between the transmission destination terminal and the transmission source terminal is determined (S53).

The CPU 21 in the control device 15 in the transmission destination terminal performs a malfunction determination based on a condition where the response packet is received or the response packet is not received. When the wireless communication device 11 of the transmission destination terminal receives the response packet transmitted from a position separated from the transmission destination terminal by a predetermined distance or over, the CPU 21 determines whether the wireless communication device 11 is out of order by considering that the response packets is received.

Since it may be possible to diagnose the wireless communication device 11 as being in a malfunction when only the response packet is received from a short distance, it may be possible to perform a malfunction diagnosis of the wireless communication device 11 more highly.

Third Embodiment

An in-vehicle apparatus 1 in a third embodiment has a hardware configuration similar to the in-vehicle apparatus 1 in the first embodiment. Contents of the processing performed by the control device 15 (especially, the CPU 21) is different from the processing performed in the first embodiment. In the present embodiment, when the CPU 21 receives the response request packet, the CPU receiving the response request packet does not transmit the response packet in a case where a terminal of the transmission source exists in the vicinity of the subject terminal.

(1) Processing by CPU 21 in Control Device 15

Figure 6:
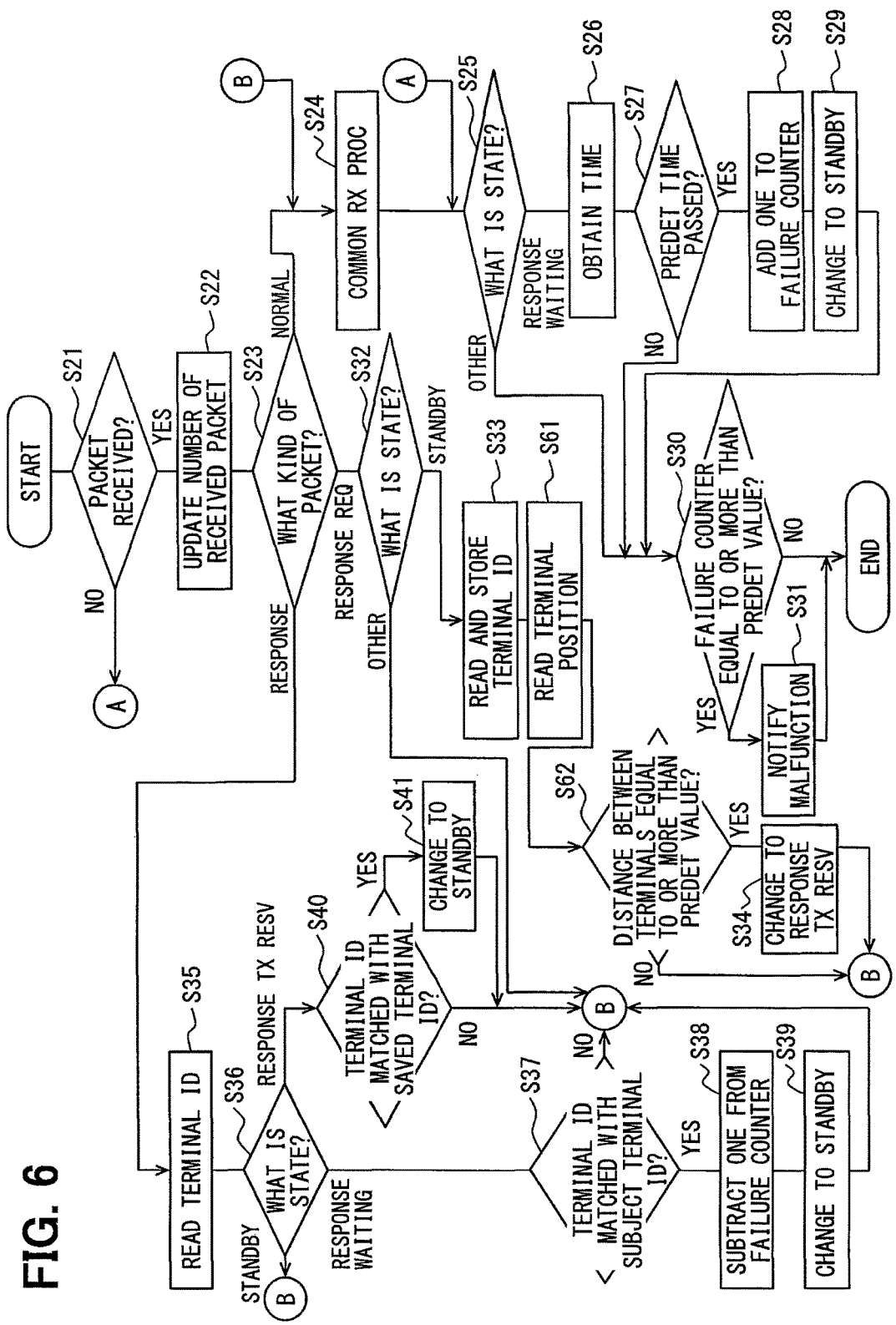
FIG. 6 is a flowchart illustrating a reception processing in a third embodiment.

The transmission processing in the present embodiment is similar to the first embodiment. A reception processing will be explained based on a flowchart illustrated in FIG. 6. Incidentally, a processing similar to the flowchart in FIG. 4 will have the identical symbols, the explanation will be omitted, and a processing different from the flowchart of FIG. 4 will be explained.

The CPU 21 reads a terminal ID from a received response request packet at S33 and stores the terminal ID to the memory, and the processing in the present embodiment shifts to S61.

At S61, the CPU 21 reads positional information representing a terminal position from the received response request packet. The positional information represents the position of the terminal (an in-vehicle terminal 1) of the transmission source, which assembles the response request packet. After S61, the processing shifts to S62.

At S62, the CPU 21 determines whether a distance between the subject terminal and the transmission source terminal read at S61 is equal or more than a predetermined value. The predetermined value may be equal to 100 meters, for example. When the distance between the terminals is equal to or more than 100 meters (S62: YES), the processing shifts to S34. When the distance between the terminals is not equal to or more than 100 meters (S62: NO), the processing shifts to S24 instead of executing the processing of S34.

(2) Effects

The communication system in the present embodiment performs a malfunction determination when the congestion degree of communication is equal to or less than a predetermined threshold, similar to the communication system in the first embodiment. Therefore, it may be possible to suppress obstruction of transmission and reception of other information.

In addition, according to the present embodiment, based on information representing the position of the transmission source terminal and being included in the response request packet and the position of the terminal receiving the response request packet, the distance between the transmission destination terminal and the transmission source terminal is determined. When the wireless communication device 11 receives the response request packet that is transmitted from a position separated by a predetermined distance or over (S62: YES), the in-vehicle apparatus 1 that receives the response request packet transmits the response packet to the terminal of the transmission source of the response request packet.

Therefore, since the response packet is transmitted from a position separated by the predetermined distance or over, it may be possible to confirm a reception of a packet from a distance place and it may be possible to perform a malfunction diagnosis of the wireless communication device 11 more highly.

Fourth Embodiment

An in-vehicle apparatus 1 in a fourth embodiment has a hardware configuration similar to the in-vehicle apparatus 1 in the first embodiment. Contents of the processing performed by the control device 15 (especially, the CPU 21) is different from the processing performed in the first embodiment. In the present embodiment, when the congestion degree of the wireless communication is determined, the congestion degree is determined from a usage rate of a wireless bandwidth (corresponding to a usage rate of a communication channel) instead of the number of the received packets in a fixed period.

(1) Determination of Congestion Degree

A difference between the first embodiment and the fourth embodiment will be explained with referring to FIG. 7A and FIG. 7B.

Figure 7A:
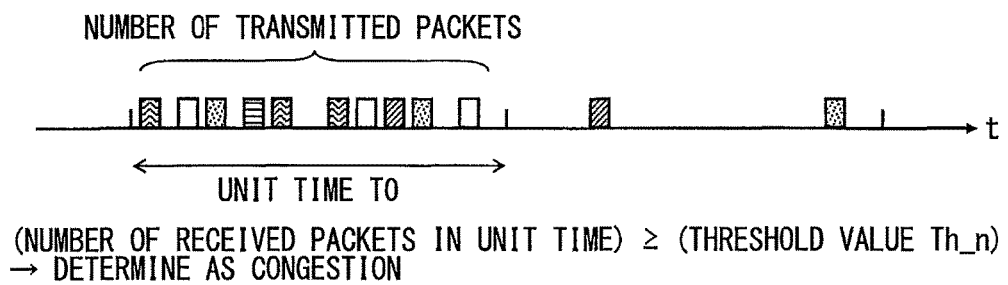
FIG. 7A is a drawing illustrating a determination method of a congestion degree in the first embodiment.

FIG. 7A illustrates a determination manner by the congestion degree of the communication channel based on the number of the received packets. In the first embodiment, as described in FIG. 7A, the congestion degree of the communication channel (a frequency bandwidth) is determined by determining the number of the packets. That is, it is determined that the communication channel is crowded, as the number of the packets received within a unit time T0 increase. When the number of the packets received within the unit time T0 exceeds a threshold value Th_n, it is determined that the communication channel is crowded and the malfunction diagnosis is not executed.

Figure 7B:
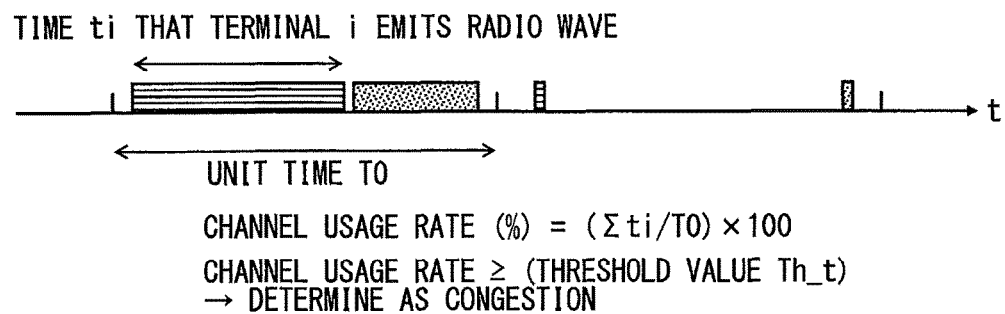
FIG. 7B is a drawing illustrating a determination method of a congestion degree in a fourth embodiment.

FIG. 7B illustrates a determination manner by the congestion degree based on the usage rate of the communication channel. In the fourth embodiment, the congestion degree is determined by the usage rate of the communication channel as described in FIG. 7B. For example, when a length of a packet is variable, a single packet may occupy the communication channel for long time. In this case, it is determined that the communication channel is crowded when a time ti is long. The time ti corresponds to a time period when a terminal i transmits a radio wave. The usage rate (%) of the communication channel in the unit time T0 is represented by (Σti/T0)·100. When the usage rate exceeds the threshold value Th_t, it is determined that the communication channel is crowded.

(2) Processing by CPU 21 in Control Device 15

A processing of the present embodiment will be explained based on a flowchart illustrated by FIG. 8 and FIG. 9. Incidentally, a processing similar to the flowchart of FIG. 4 and FIG. 5 will have the identical symbols, the explanation will be omitted, and a processing different from the flowchart of FIG. 4 and FIG. 5 will be explained.

Figure 8:
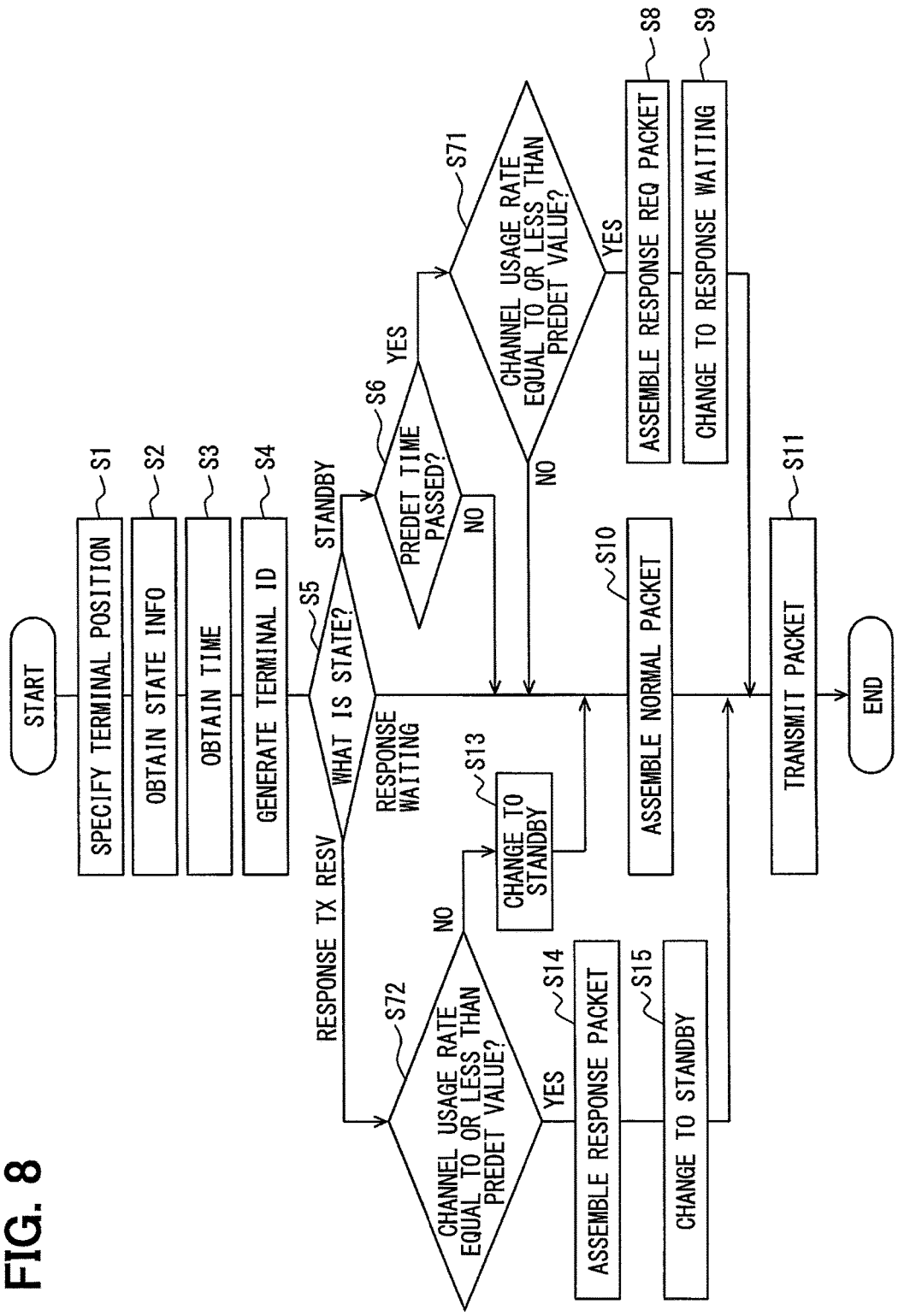
FIG. 8 is a flowchart illustrating a transmission processing in the fourth embodiment.

In the flowchart in FIG. 8, at S6, when a predetermined period elapses from a previous diagnosis (S6: YES), the processing shifts to S71.

At S71, the CPU 21 determines whether the usage rate of the channel is equal to or less than a predetermined value. When the usage rate of the channel is equal to or less than the predetermined value (S71: YES), the processing shifts to S8. When the usage rate of the channel is not equal to or less than the predetermined value (S71: NO), the processing shifts to S10.

When it is determined as the response transmission reservation at S5, the processing shifts to S72.

At S72, the CPU 21 determines whether the usage rate of the channel is equal to or less than the predetermined value. When the usage rate of the channel is not equal to or less than the predetermined value (S72: NO), the processing shifts to S13. When the usage rate of the channel is equal to or less than the predetermined value (S72: YES), the processing shifts to S14.

Figure 5:
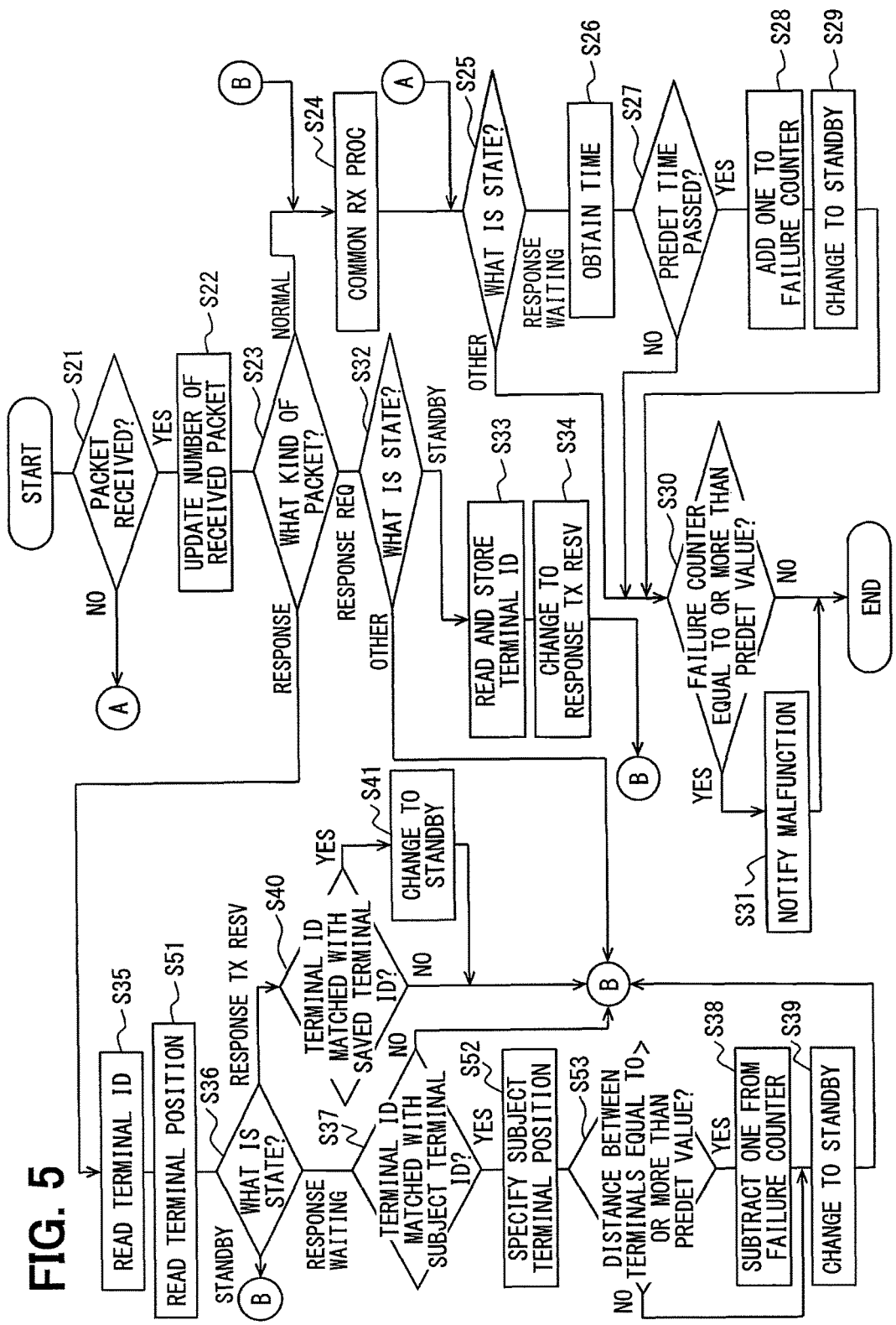
FIG. 5 is a flowchart illustrating a reception processing in a second embodiment.
Figure 9:
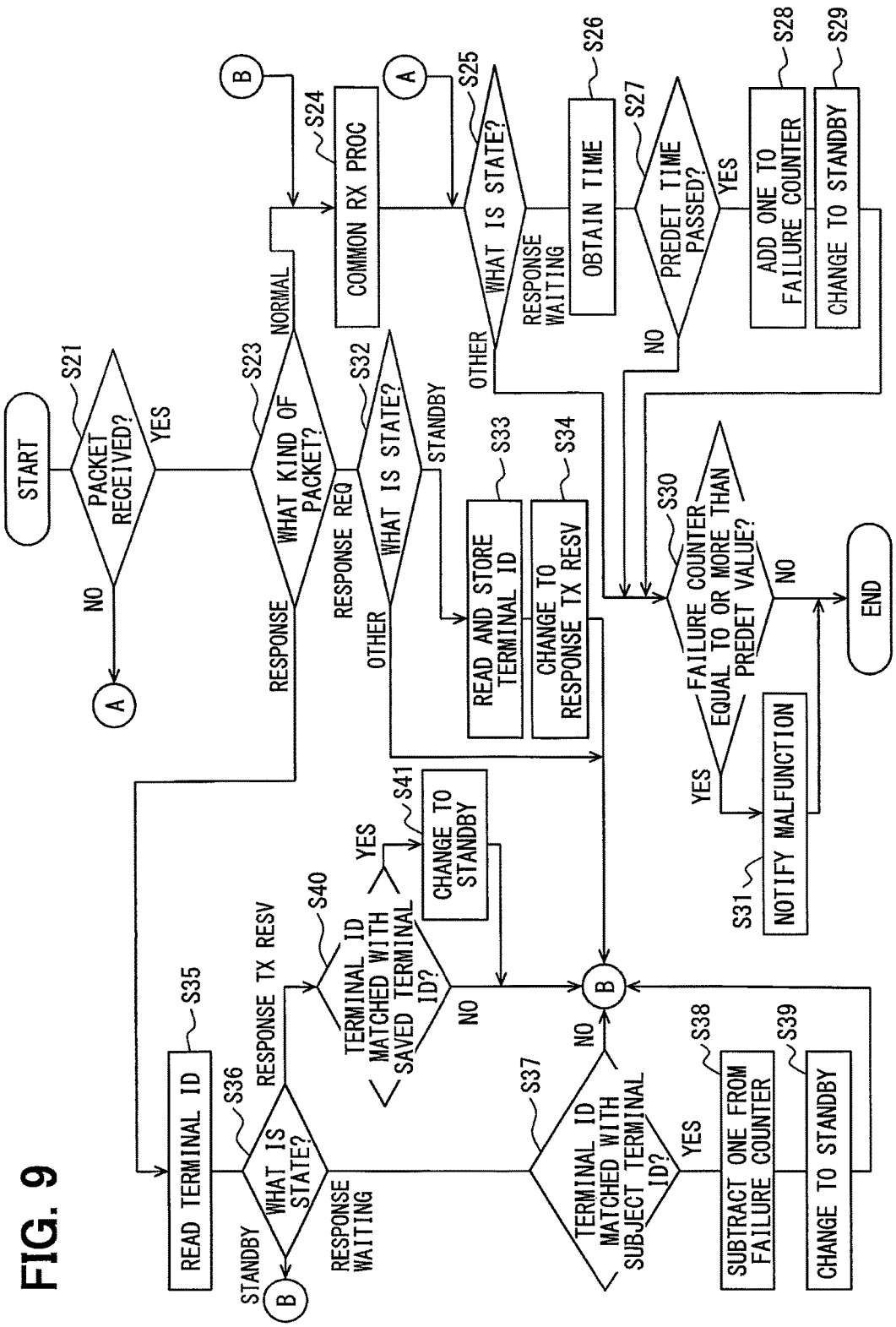
FIG. 9 is a flowchart illustrating a reception processing in the fourth embodiment.

The flowchart in FIG. 9 is different from the flowchart in FIG. 5 in a point that the processing of S22 is not executed in FIG. 9. Therefore, the explanation will be omitted.

(3) Effects

The communication system in the present embodiment performs a malfunction determination when the congestion degree of the communication is equal to or less than a predetermined threshold, similar to the communication system in the first embodiment. Therefore, it may be possible to suppress obstruction of transmission and reception of other information.

In addition, in the present embodiment, since it is determined that the congestion degree is high as the usage rate of the wireless bandwidth is higher, it may be possible to appropriately determine the congestion degree according to density of in-vehicle apparatuses 1.

Alternatively, in the present embodiment, the following processing may be possible. It may be determined whether a terminal having a reception signal of a predetermined strength or more exists in the periphery of the subject terminal. In a case where the terminal having the reception signal of the predetermined strength or more exists, a malfunction diagnosis may be performed (that is, the processing shifts to S8 or S14). A certainty of communication may be reduced when the signal strength is low.

Fifth Embodiment

An in-vehicle apparatus 1 in a fifth embodiment has a hardware configuration similar to the in-vehicle apparatus 1 in the first embodiment. The processing performed by the control device 15 (especially, the CPU 21) is different from the processing performed in the first embodiment. The CPU 21 in the present embodiment may be an example of an elapse determination portion in the present disclosure.

In the present embodiment, the in-vehicle apparatus 1 performing a malfunction determination does not transmit a signal (corresponding to the response request packet), which is a trigger for the malfunction determination.

In addition, the storage region configured by the non-volatile memory 27 includes a response reception counter, in addition to the failure counter. The response reception counter corresponds to a counter that counts the number of times of receiving the response packets within in a past fixed period.

(1) State Transition of Diagnosis

Figure 10:
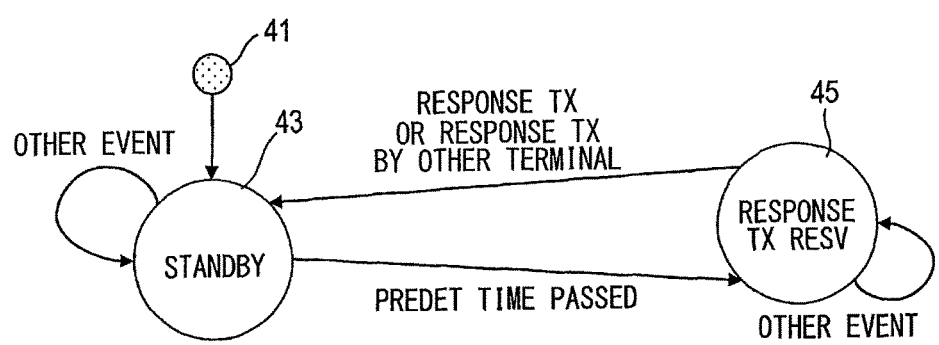
FIG. 10 is a drawing illustrating a state transition in a diagnosis in a fifth embodiment.

The in-vehicle apparatus 1 initially transits from an initial state 41 to a standby state 43 as described in FIG. 10. The in-vehicle apparatus 1 transits to a response transmission reservation state 45 when a predetermined time elapses after a previous response. In the response transmission reservation state 45, the in-vehicle apparatus 1 transmits a response to a predetermined terminal (that is, transmits a response packet). When the subject terminal transmits the response to the predetermined terminal or a third terminal other than the predetermined terminal and the subject terminal transmits the response, the subject terminal transits to the standby state 43.

Incidentally, since the response transmission in the present embodiment is not triggered by a response request, the response transmission may not be a response strictly. However, the response transmission may be referred to as a response for convenience of explanation. The previous response means a case where the response packet is transmitted in the last time or a case where the subject terminal becomes in the response transmission reservation state for transmitting the response packet.

(2) Processing by CPU 21 in Control Device 15

(2-1) Transmission Processing

Figure 11:
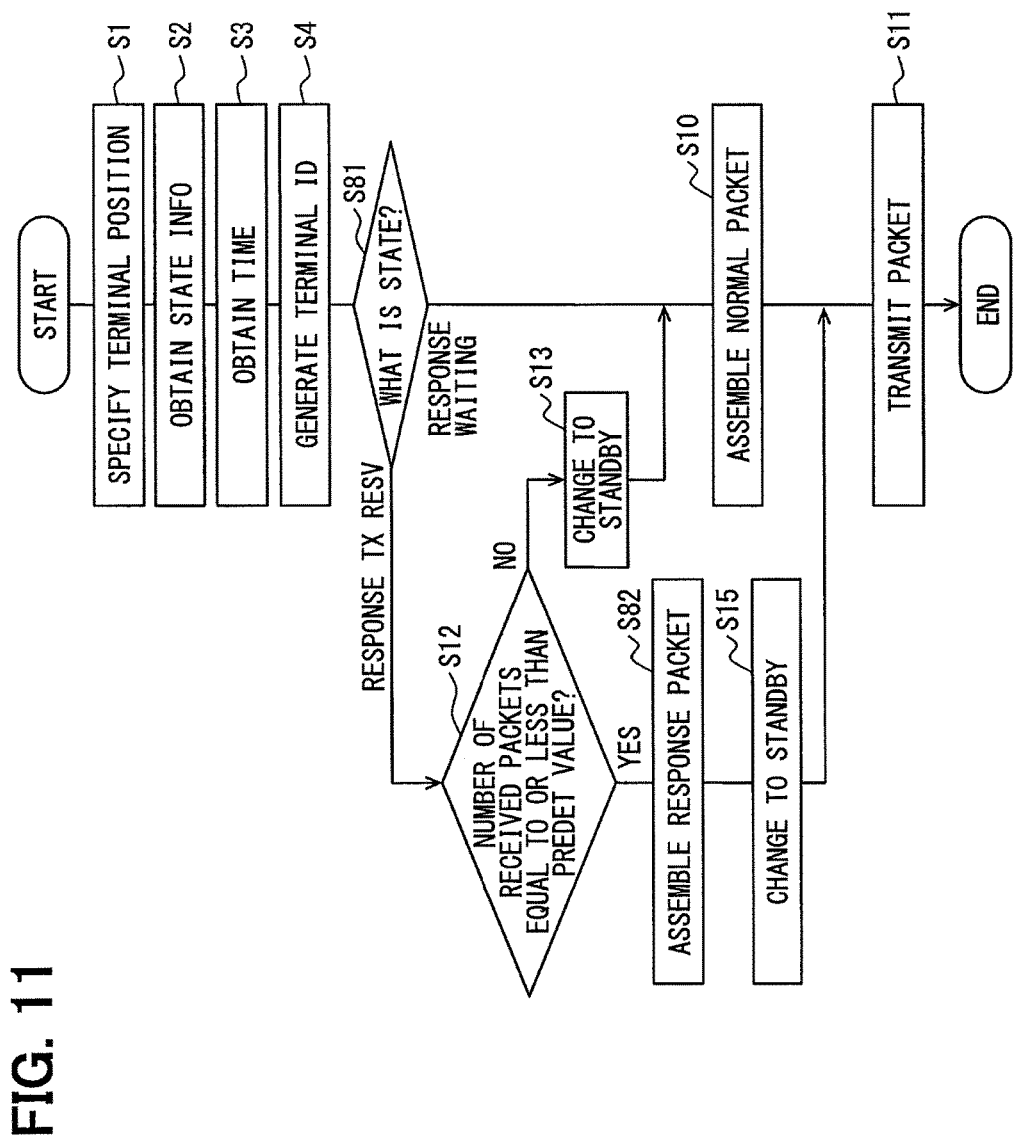
FIG. 11 is a flowchart illustrating a transmission processing in the fifth embodiment.

A transmission processing that the CPU 21 of the control device 15 performs will be explained based on a flowchart illustrated in FIG. 11. Incidentally, a processing similar to the flowchart of FIG. 3 will have the identical symbols, the explanation will be omitted, and a processing different from the flowchart of FIG. 3 will be explained.

In the present embodiment, after the CPU 21 generates the terminal ID at S4, the processing shifts to S81.

At S81, the CPU 21 determines the diagnostic state of the in-vehicle apparatus 1. As described in FIG. 10, the diagnostic state corresponds to the standby or the response transmission reservation. When it is determined as the standby, the processing shifts to S10. When it is determined as the response transmission reservation, the processing shifts to S12.

When the number of the received packets in the past fixed period is equal to or less than a predetermined value at S12 (S12: YES), the processing shifts to S82.

At S82, the CPU 21 assembles the response packet. In the first embodiment, a message of the response packet assembled at S14 includes the terminal ID of the transmission source of the response request. In the present embodiment, instead of the terminal ID of the transmission source, a message of the response packet includes a terminal ID of the transmission source of the normal packet that is read from the normal packet at S97 and is stored to the memory.

(2-2) Reception Processing

Figure 12:
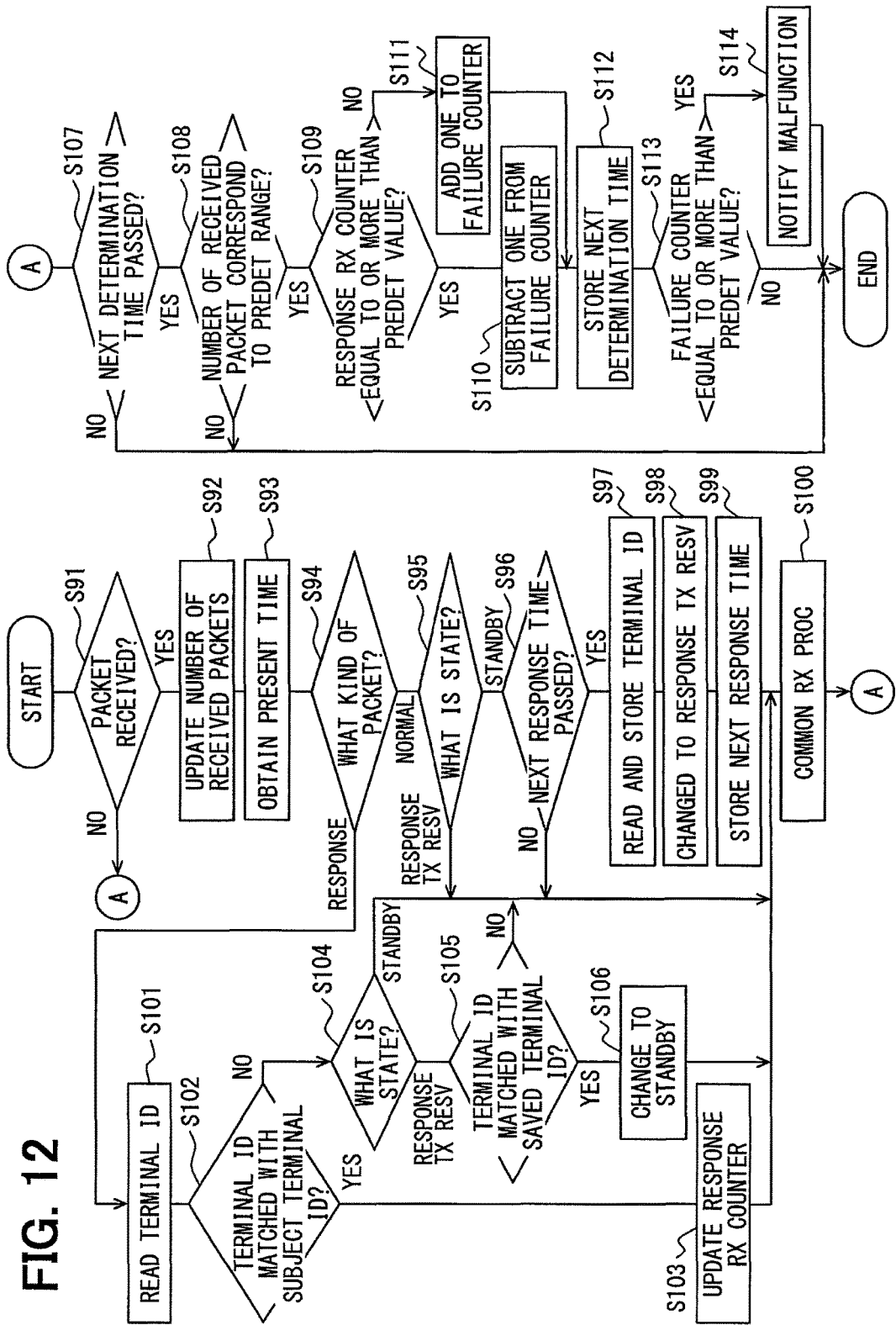
FIG. 12 is a flowchart illustrating a reception processing in a fifth embodiment.

A reception processing that the CPU 21 of the control device 15 performs will be explained based on a flowchart illustrated in FIG. 12. The reception processing is performed when a predetermined event occurs. The predetermined event includes a case (corresponding to a timer termination of 1 second, for example) where a timer counting from a previous reception processing initiation is terminated, a case where a wireless packet is received, or the like.

(Processing at the Time of Initiation of Reception Processing)

Processings of S91 to S94 are initially executed when the reception processing is initiated.

At S91, the CPU 21 determines whether a packet is received by wireless communication. When the CPU 21 receives the packet (S91: YES), the processing shifts to S92. When the CPU 21 does not receive the packet (S91: NO), the processing shifts to S107.

At S92, the CPU 21 updates the number of the received packets in a past fixed period. After S92, the processing shifts to S93.

The CPU 21 obtains a time from a signal transmitted from the GPS satellite at S93. After S93, the processing shifts to S94.

At S94, the CPU 21 determines a kind of the packet which the CPU 21 has determined as reception at S91. The kind of the packet corresponds to a normal packet or a response packet. The normal packet is described as "normal" and the response packet is described as "response" in the drawings. Each case will be explained. Incidentally, a processing following S107 is common in each case, and the common processing will be explained separately.

(Processing at the Time of Reception of Normal Packet)

When it is determined as the normal packet at S94, the processing shifts to S95.

At S95, the CPU 21 determines the diagnostic state of the in-vehicle apparatus 1. When the diagnostic state corresponds to the standby, the processing shifts to S96. When the diagnostic state corresponds to the response transmission reservation, the processing shifts to S100.

At S96, the CPU 21 determines whether a current time elapses a next response time, which is set at S99. When the next response time is elapsed (S96: YES), the processing shifts to S97. When the next response time is not elapsed (S96: NO), the processing shifts to S100.

At S97, the CPU 21 reads the terminal ID from the received normal packet, and saves the terminal ID in the memory. The terminal ID saved at S97 is the terminal ID of the transmission source that has transmitted the normal packet. The terminal of the transmission source corresponds to a terminal that performs the malfunction diagnosis. The terminal ID is used as a transmission destination terminal ID and is included in the response packet at S82. In addition, the terminal ID is also used for preventing a transmission of an overlapped response at S105. After S97, the processing shifts to S98.

The CPU 21 transits the diagnostic state of the in-vehicle apparatus 1 to the response transmission reservation at S98. After S98, the processing shifts to S99.

At S99, the CPU 21 adds a predetermined minimum interval and a random time to a present time to obtain the next response time, and stores the next response time to the memory. The predetermined minimum interval may be 1 hour, for example. When the minimum interval is long, the next response time may be stored to the non-volatile memory 27. After S99, the processing shifts to S100.

At S100, the CPU 21 initiates the common reception processing. In the processing of S100, based on positional information and status information of a vehicle, a control with respect to a travelling of the vehicle and information notification to an occupant or the like is executed. The received packet includes the positional information and the status information. For example, the control with respect to the travelling of the vehicle may be a control for preventing a collision with a vehicle. The information notification may be notification of traffic situation in the surrounding of the vehicle. After initiating the common reception processing, the processing shifts to S107.

(Processing at the Time of Reception of Response Packet)

The processing shifts to S101 when it is determined as the response packet at S94.

At S101, the CPU 21 reads the transmission destination terminal ID from the received response packet. The transmission destination terminal ID corresponds to information included by the terminal (the in-vehicle apparatus 1) of the transmission source and corresponds to a terminal ID to which the response packet should be transmitted. After S101, the processing shifts to S102.

At S102, the CPU 21 determines whether the transmission destination terminal ID read at S101 is matched with the terminal ID of the subject terminal. The terminal ID of the subject terminal corresponds to the terminal ID generated at S4. When the terminal ID read out is matched with the terminal ID of the subject terminal (S102: YES), the processing shifts to S103. When the terminal ID read out is not matched with the terminal ID (S102: NO), the processing shifts to S104.

At S103, the CPU 21 updates the response reception counter to the number of the response packets. The number of the response packets corresponds to the number that the transmission destination terminal ID is matched with the terminal ID of the subject terminal among the response packets, which has been received in a past fixed period. After S103, the processing shifts to S100.

At S104, the CPU 21 determines the diagnostic state of the in-vehicle apparatus 1. When the diagnostic state corresponds to the standby, the processing shifts to S100. When the diagnostic state corresponds to the response transmission reservation, the processing shifts to S105.

At S105, the CPU 21 determines whether the transmission destination terminal ID read at S101 is matched with the terminal ID stored in the memory at S97. When the terminal ID read at S101 is matched with the terminal ID stored in the memory (S105: YES), the processing shifts to S106. When the terminal ID is not matched with the terminal ID (S105: NO), the processing shifts to S100.

The CPU 21 transits the diagnostic state of the in-vehicle apparatus 1 to the standby at S106. When it is determined as YES at S105, this case represents that another terminal other than the in-vehicle apparatus 1, which is the subject terminal, and an in-vehicle apparatus 1 having the transmission destination terminal ID has transmitted the response packet. Therefore, according to the state transition at S106, so that the subject terminal does not transmit the response packet, it may be possible to suppress transmission of an overlapped response packet. After S106, the processing shifts to S100.

(Common Processing)

At S107, the CPU 21 determines whether the present time elapses a next determination time. The next determination time is set at S112. When the next determination time is elapsed (S107: YES), the processing shifts to S108. When the next determination time is not elapsed (S107: NO), the reception processing ends.

At S108, the CPU 21 determines whether the number of the received packets in a past predetermined period is in a predetermined range that is specified by an upper limit value and a lower limit value. The lower limit value is equal to or more than zero. The processing of S108 determines that vehicles including an apparatus that performs vehicle-vehicle communication such as the in-vehicle apparatus 1 are a few around the subject vehicle and a congestion degree of communication is not excessive. The number of the received packets in the past fixed period is counted at S92. When the number of the packets in the past fixed period is less than the lower limit value, it is considered that the apparatus enabling to perform vehicle-vehicle communication around the subject vehicle does not exist and the malfunction diagnosis is not performed.

When the number of the received packets in the past fixed period is in the predetermined range (S108: YES), the processing shifts to S109. When the number of the packets is not in the predetermined range (S108: NO), the reception processing ends.

At S109, the CPU 21 determines whether the response reception counter is equal to or more than a predetermined value. When the response reception counter is equal to or more than the predetermined value (S109: YES), the processing shifts to S110. When the response reception counter is not equal to or more than the predetermined value (S109: NO), the processing shifts to S111.

At S110, the CPU 21 subtracts 1 from the failure counter. When a counter value of the failure counter is equal to or less than zero after subtraction, the counter value is set to zero. After S110, the processing shifts to S112.

At S111, the CPU 21 adds 1 to the failure counter. After S111, the processing shifts to S112.

At S112, the CPU 21 adds a predetermined determination interval to a present time to obtain the next determination time, and stores the next determination time to the memory. The predetermined determination interval may be 1 hour, for example. When the determination interval is long, the next determination time may be stored to the non-volatile memory 27. After S112, the processing shifts to S113.

At S113, the CPU 21 determines whether the failure counter is equal to or more than a predetermined value. When the failure counter is equal to or more than the predetermined value (S113: YES), the processing shifts to S114. When the failure counter is not equal to or more than the predetermined value (S113: NO), the reception processing ends.

At S114, the CPU 21 determines as a malfunction with respect to the communication function (the wireless communication device 11) and notifies the malfunction to an occupant using a display or a speaker provided to an inside of the vehicle. After S114, the reception processing ends.

(3) Effects

The communication system in the present embodiment determines a malfunction when the congestion degree of communication is equal to or less than a predetermined threshold similar to the communication system in the first embodiment. Therefore, it may be possible to suppress obstruction of transmission and reception of other information.

In the present embodiment, the CPU 21 of the control device 15 does not execute a transmission of the response request packet and the CPU 21 determines whether the next response time is elapsed after the response packet is transmitted (that is, whether a predetermined time elapses). When the next response time is elapsed (S96: YES) and the CPU 21 has received the normal packet (S94: YES), the CPU 21 transmits the response packet to the transmission source terminal, which has transmitted the normal packet.

Accordingly, even when a response request packet is not transmitted, it may be possible that an in-vehicle apparatus 1 corresponding to a terminal of a transmission source of the response packet transmits a response packet with a proper time interval.

Sixth Embodiment

An in-vehicle apparatus 1 in a sixth embodiment has a hardware configuration similar to the in-vehicle apparatus 1 in the first embodiment. The processing performed by the control device 15 (especially, the CPU 21) is different from the processing performed in the first embodiment. In the present embodiment, a response request packet is transmitted when another terminal (an in-vehicle apparatus 1) exists in a predetermined range around the subject terminal. The CPU 21 in the present embodiment may be an example of an existence determination portion in the present disclosure.

(1) Processing by CPU 21 in Control Device 15

Figure 13:
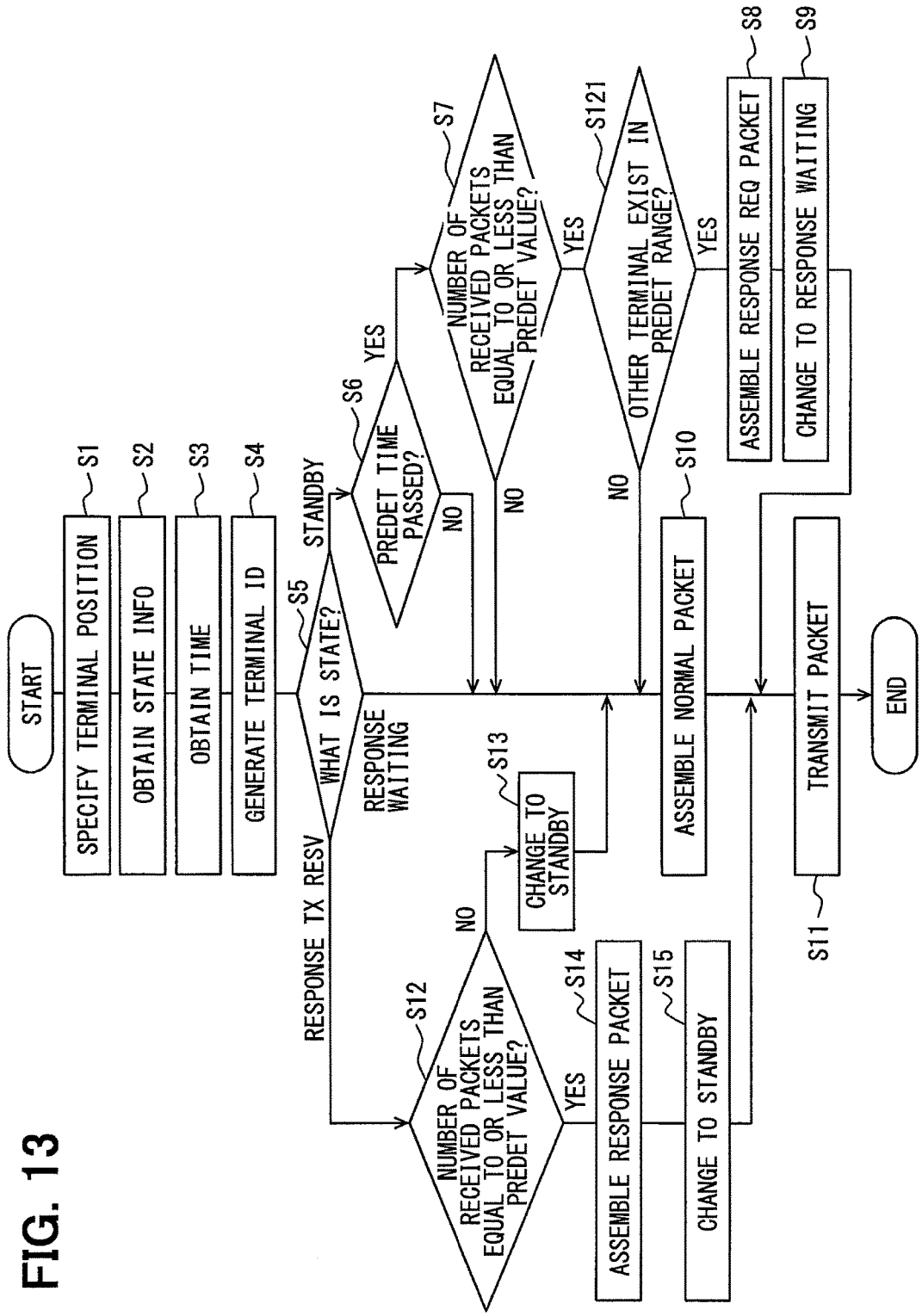
FIG. 13 is a flowchart illustrating a transmission processing in the sixth embodiment.

A transmission processing in the present embodiment will be explained based on a flowchart illustrated in FIG. 13. Incidentally, a processing similar to the flowchart of FIG. 4 will have the identical symbols, the explanation will be omitted, and a processing different from the flowchart of FIG. 4 will be explained.

When the number of the received packets in the past fixed period is equal to or less than a predetermined value (S7: YES), the processing shifts to S121.

At S121, the CPU 21 determines whether another terminal (another in-vehicle apparatus 1) exists within a predetermined range around the subject terminal. Based on a position of the transmission source terminal of a packet read at S122 executed in a past fixed period and a position of the subject terminal specified at S1, the CPU 21 determines whether another terminal exists within the predetermined range.

At S121, when another terminal exists within the predetermined range (S121: YES), the processing shifts to S8 and the CPU 21 assembles the response request packet. When another terminal does not exist within the predetermined range (S121: NO), the processing shifts to S10.

Figure 14:
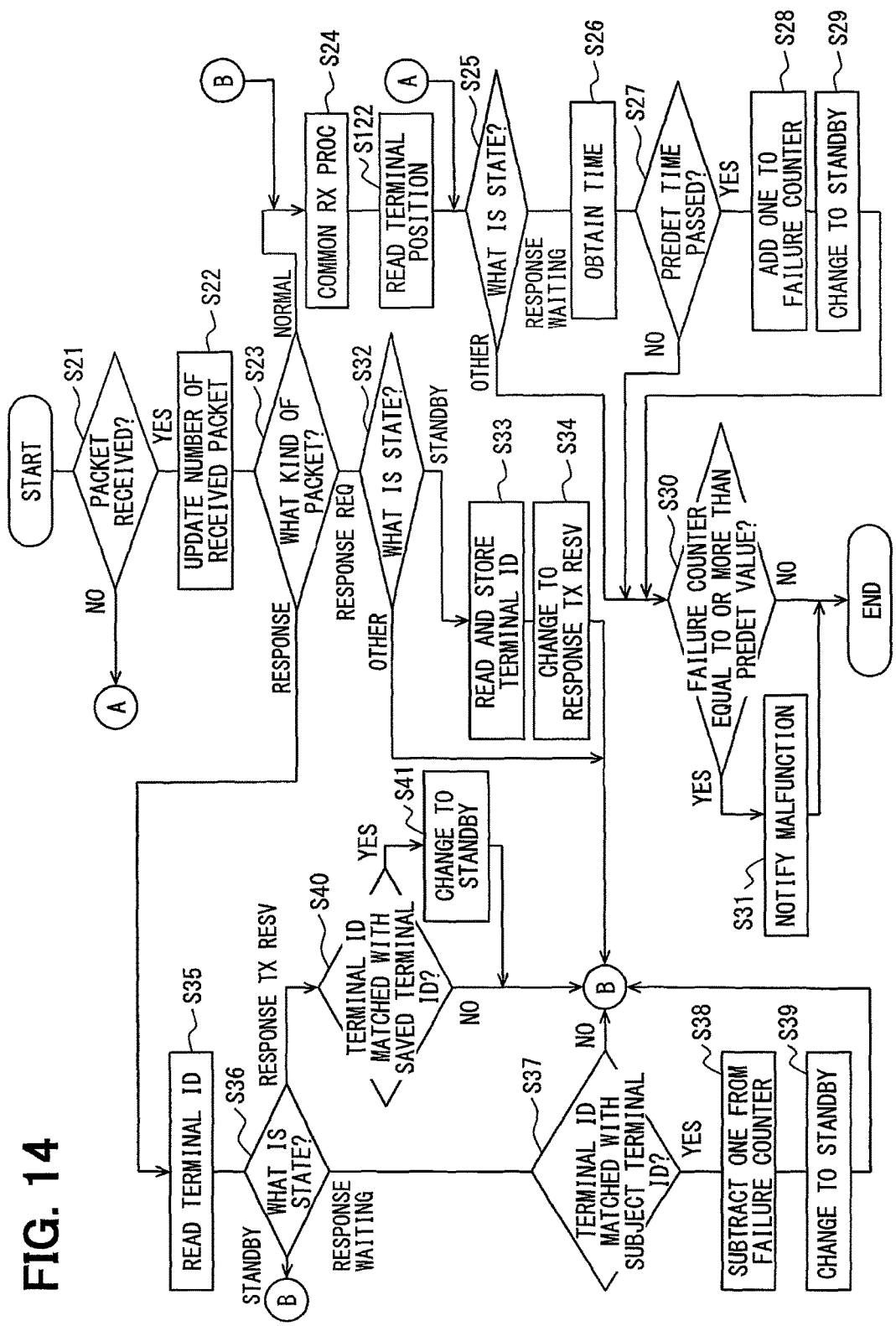
FIG. 14 is a flowchart illustrating a reception processing in a sixth embodiment.

A reception processing in the present embodiment will be explained based on a flowchart illustrated in FIG. 14. Incidentally, a processing similar to the flowchart of FIG. 5 will have the identical symbols, the explanation will be omitted, and a processing different from the flowchart of FIG. 5 will be explained.

After S24, the processing shifts to S122.

At S122, the CPU 21 reads the positional information of the terminal of the transmission source from the received packet, and saves the positional information in the memory for a fixed period. After S122, the processing shifts to S25.

(2) Effects

The communication system in the present embodiment performs a malfunction determination when the congestion degree of communication is equal to or less than a predetermined threshold, similar to the communication system in the first embodiment. Therefore, it may be possible to suppress obstruction of transmission and reception of other information.

In addition, in the present embodiment, the response request packet is assembled and transmitted when another terminal exists within a predetermined range around the subject terminal.

Therefore, it may be possible to prevent the response request packet from being transmitted in spite of a case where an in-vehicle apparatus 1 enabling to receive the response request packet does not exist around the subject terminal. It may be possible to prevent the subject terminal from determining as a malfunction due to lack of reception of the response packet. It may be possible to prevent a certainty of communication from reducing since the subject terminal is distant from another terminal. It may be possible to improve reliability of the malfunction diagnosis.

Incidentally, an existence of another terminal is determined by reading a position of a transmission source terminal from the received packet in the present embodiment. Another terminal may be detected by another manner, so that the existence of another terminal within a predetermined range may be determined.

For example, the existence of another terminal within a predetermined range (corresponding to a communicable range in this case) may be detected by receiving a packet from another terminal. Alternatively, the existence of another terminal may be detected by obtaining existence information of another terminal from a third terminal. The third terminal corresponds to a terminal other than the subject terminal and another terminal transmitting the packet.

(Modifications)

The present disclosure is not limited to the present embodiments. The present disclosure may be realized by various manner within a technical scope of the present disclosure.

Figure 15:
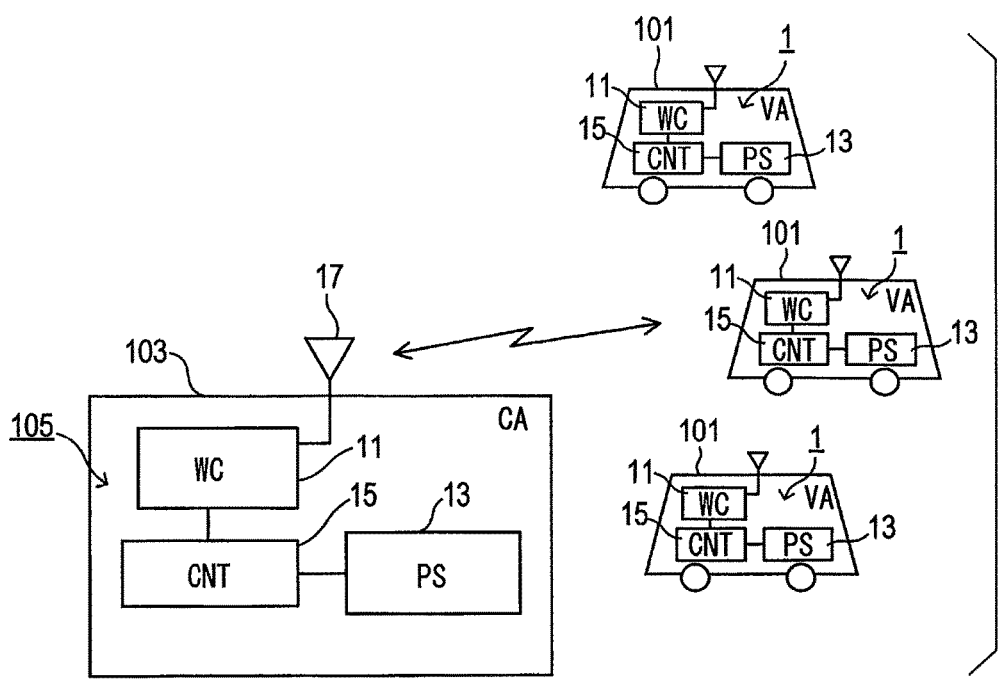
FIG. 15 is a block diagram illustrating a schematic configuration of a communication system in another embodiment.

For example, in each of the present embodiments, a communication system is configured from multiple in-vehicle apparatus 1 having the similar hardware configuration other than a program. However, a communication system may be configured from multiple apparatus partially different each other as long as a required function is satisfied. For example, as described in FIG. 15, a communication apparatus 105 having a hardware similar to the in-vehicle apparatus 1 may be provided to a roadside apparatus 103, the communication apparatus 105 may execute an operation similar to the in-vehicle apparatus 1, and a malfunction diagnosis may be performed. In this case, the present disclosure may be realized by an apparatus performing road-vehicle communication. Alternatively, the present disclosure may be realized by communication apparatus provided to roadside apparatuses or a communication apparatus provided to a moving body (for example, a pedestrian) other than a vehicle.

Alternatively, a first in-vehicle apparatus may transmit the response request packet, receive a response packet and perform a malfunction diagnosis, and a second in-vehicle apparatus may receive the response request packet and transmit the response packet. In this case, it may be possible to realize a malfunction diagnosis of a wireless communication device in the first in-vehicle apparatus.

In each of the present embodiments, the number of the received packets or the usage rate of the wireless bandwidth is used for determining the congestion degree of communication. Any other manner may be used for determining the congestion degree as long as a status of network traffic may be measured or estimated. For example, information of congestion status of network traffic may be obtained from another measurement apparatus measuring the congestion status of the network traffic, and the congestion degree may be determined based the information. Alternatively, information that is directly used as the congestion degree may be obtained.

In each of the embodiments, the in-vehicle apparatuses 1 that enable to perform vehicle-vehicle communication perform communication with each other directly. The in-vehicle apparatuses 1 may perform communication with each other indirectly. For example, an in-vehicle apparatus 1 may perform road-vehicle communication with a roadside apparatus provided along a road and communication between vehicles may be performed through the roadside apparatus. In addition, a communication system and a configuration of transmitted data are not limited to the present embodiments and various modifications may be applied to the present disclosure.

Each function included in the in-vehicle apparatus may be realized by a computer with a wireless communication device or a computer connectable to a wireless communication device, using a program.

The program may be configured from sequential strings of instructions that are proper for processing by a computer. The program may be stored in an ROM, an RAM, or the like assembled to the computer. The program may be loaded to the computer to be used, or may be loaded to the computer through various recording media or a communication line to be used.

The various recording media include an optical disk such as CD-ROM, DVD-ROM or the like, a magnetic disk, a semiconductor memory, etc.

The control device may be a programmable logic device such as ASIC (application specific integrated circuits), FPGA (field programmable gate array), or the like or a discrete circuit.

Therefore, according to one aspect of the present disclosure, a communication system including a first communication apparatus and a second communication apparatus. The first communication apparatus includes a communication portion that enables to perform wireless communication. The second communication apparatus includes a communication portion that enables to perform wireless communication. The first communication apparatus includes a first transmission portion. The first transmission portion transmits a first signal to another communication apparatus. The first signal at least includes information enabling to specify the first communication apparatus. The second communication apparatus that corresponds to the other communication apparatus receiving the first signal includes a second transmission portion. The second transmission portion transmits a second signal to the first communication apparatus when the second communication apparatus receives the first signal. The first communication apparatus includes a malfunction determination portion. The malfunction determination portion determines whether the communication portion of the first communication apparatus is out of order according to a reception status of the second signal. The communication system includes a congestion determination portion determining a congestion degree of communication in at least one of the communication portion of the first communication apparatus and the communication portion of the second communication apparatus. At least one of the first signal by the first transmission portion and the second signal by the second transmission portion is transmitted when the congestion determination portion determines that the congestion degree is equal to or less than a predetermined threshold.

According to the communication system, a communication is performed for a malfunction determination when the congestion degree of communication is equal to or less than a predetermined threshold. Therefore, it may be possible to suppress obstruction of transmission and reception of other information. The other information may correspond to, for example, data for obtaining vehicle status information, which is required for preventing collision of a vehicle.

Alternatively, in the communication system, the first communication apparatus may be mounted to and used in, for example, a vehicle or a roadside apparatus. The second communication apparatus may be mounted to and used in, for example, a vehicle.

Incidentally, the first signal may correspond to the response request signal that requests a transmission of the response signal to the first communication apparatus. The second signal may correspond to a response signal to the response request signal.

According to the communication system, since the second communication apparatus transmits the response signal when the first communication apparatus transmits the response request signal, it may be possible to prevent communication traffic for a malfunction diagnosis from increasing at time when the malfunction diagnosis is unnecessary.

The communication system may include an elapse determination portion that determines whether a predetermined time is elapsed after a second transmission portion transmits the second signal. The second transmission portion may transmit the second signal to the first communication apparatus when the elapse determination portion determines that the predetermined time is elapsed and the first signal is received.

According to the communication system, the second signal, which corresponds to an indicator of a malfunction determination performed by the malfunction determination portion, is transmitted with a predetermined time interval. Therefore, it may be possible to prevent communication traffic for the malfunction diagnosis from increasing.

According to another aspect of the present disclosure, a communication apparatus having a function of the first communication apparatus that configures the communication system is provided. The communication apparatus configures the communication system.

According to another aspect of the present disclosure, a communication apparatus having a function of the second communication apparatus that configures the communication system is provided. The communication apparatus configures the communication system.

Incidentally, the present disclosure may be realized by various modes such as a program that causes a computer to function as each portion configuring the first communication system or the second communication system, a malfunction diagnosis method, or the like.

It is noted that a flowchart or a processing of the flowchart in the present application includes steps (also referred to as sections), each of which is represented, for example, as S1. Further, each step may be divided into several sub-steps, and several steps may be combined into a single step.

Incidentally, the first transmission portion corresponds to processing of S8, S10, and S11 in the present embodiment. The second transmission portion corresponds to S14, S82, and S11. The malfunction determination portion corresponds to S30, S31, S113, and S114. The congestion determination portion corresponds to S7, S12, S71, and S72. The elapse determination portion corresponds to S96. The existence determination portion corresponds to S121, and S122.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A communication system comprising:
   a first communication transceiver wirelessly communicating with a second communication transceiver;
   a first controller coupled to the first communication transceiver, the first controller configured to
   transmit a first signal from the first communication transceiver to the second communication transceiver and to receive a second signal from the second communication transceiver, the first signal at least including information enabling to specify the first communication transceiver, and
   determine whether the first communication transceiver is out of order according to a reception status of the second signal; and
   a second controller coupled to the second communication transceiver, the second controller configured to transmit the second signal from the second communication transceiver to the first communication transceiver upon receiving the first signal sent from the first controller via the first communication transceiver,
   wherein:
   the first controller further determines a congestion degree of communication in the first communication transceiver; and
   the first controller transmits the first signal from the first communication transceiver to the second communication transceiver when the congestion degree of communication in the first communication transceiver is equal to or less than a predetermined threshold.

2. The communication system according to claim 1, wherein
the first signal corresponds to a response request signal that requests a transmission of a response signal to the first communication transceiver, and
the second signal corresponds to the response signal responding to the response request signal.

3. The communication system according to claim 2, wherein
the second controller further determines whether a predetermined time elapses after transmission of the second signal by the second controller, and
the second controller transmits the second signal from the second communication transceiver to the first communication transceiver when determining that the predetermined time elapses and also that the second communication transceiver receives the first signal from the first communication transceiver.

4. The communication system according to claim 2, wherein
the first controller further determines whether the second communication transceiver exists in a predetermined range around the first communication transceiver, and
the first controller transmits the response request signal when determining that the second communication transceiver exists in the predetermined range.

5. The communication system according to claim 1, wherein
the first controller determines that the congestion degree is high as a total number of wireless packets received within a predetermined time are larger or as a usage rate of a wireless bandwidth is higher.

6. The communication system according to claim 1, wherein
the first controller performs a malfunction determination of transmission by the first communication transceiver based on a condition where the first communication transceiver receives the second signal and/or the first communication transceiver does not receive the second signal.

7. The communication system according to claim 6, wherein
the first communication transceiver includes a first position specifying transceiver that specifies a position of the first communication transceiver,
the second communication transceiver includes a second position specifying transceiver that specifies a position of the second communication transceiver,
the second signal includes information indicating the position of the second communication transceiver, and
the first controller determines that the first communication transceiver receives the second signal and the first controller performs the malfunction determination of the first communication transceiver when the first communication transceiver receives the second signal, which is transmitted from a position separated from the first communication transceiver by a predetermined distance or longer.

8. The communication system according to claim 6, wherein
the first communication transceiver includes a first position specifying transceiver that specifies a position of the first communication transceiver,
the second communication transceiver includes a second position specifying transceiver that specifies a position of the second communication transceiver,
the first signal includes information indicating the position of the first communication transceiver, and
the second controller transmits the second signal to the first communication transceiver when the second communication transceiver receives the first signal, which is transmitted from a position separated from the second communication transceiver by a predetermined distance or longer.

9. The communication system according to claim 1, wherein:
the second controller further determines a congestions degree of communication in the second communication transceiver; and
the second controller transmits the second signal to the first communication transceiver, upon determining that the congestion degree of communication in the second communication transceiver is equal to or less than a predetermined threshold.

10. A first communication apparatus comprising:
a first communication transceiver wirelessly communicating with a second communication transceiver; and
a first controller coupled to the first communication transceiver, the first controller configured to
transmit a first signal from the first communication transceiver to the second communication transceiver, the first signal at least including information enabling to specify the first communication transceiver and to receive a second signal from the second communication transceiver,
determine whether the first communication transceiver is out of order according to a reception status of the second signal, and
determines a congestion degree of communication in the first communication transceiver,
wherein:
the first controller transmits the first signal from the first communication transceiver to the second communication transceiver, when the congestion degree of communication in the first communication transceiver is equal to or less than a predetermined threshold.

11. The communication system according to claim 10, wherein
the first signal corresponds to a response request signal that requests a transmission of a response signal to the first communication transceiver, and
the second signal corresponds to the response signal responding to the response request signal.

12. The communication system according to claim 10, wherein
the second controller further determines whether a predetermined time elapses after transmission of the second signal by the second controller, and
the second controller transmits the second signal from the second communication transceiver to the first communication transceiver when determining that the predetermined time elapses and also that the second communication transceiver receives the first signal from the first communication transceiver.

13. The communication system according to claim 10, wherein
the first controller performs a malfunction determination of transmission by the first communication transceiver based on a condition where the first communication transceiver receives the second signal and/or the first communication transceiver does not receive the second signal.

14. The communication system according to claim 10, wherein
the first communication transceiver includes a first position specifying transceiver that specifies a position of the first communication transceiver,
the second communication transceiver includes a second position specifying transceiver that specifies a position of the second communication transceiver,
the second signal includes information indicating the position of the second communication transceiver, and
the first controller determines that the first communication transceiver receives the second signal and the first controller performs the malfunction determination of the first communication transceiver when the first communication transceiver receives the second signal, which is transmitted from a position separated from the first communication transceiver by a predetermined distance or longer.

15. A second communication apparatus comprising:
a second communication transceiver wirelessly communicating with a first communication transceiver; and
a second controller coupled to the second communication transceiver, the second controller configured to
transmit a second signal from the second communication transceiver to the first communication transceiver upon receiving a first signal from the first communication transceiver, and
determine a congestion degree of communication in the second communication transceiver,
wherein:
the second controller transmits the second signal from the second communication transceiver to the first communication transceiver, when the congestion degree of communication in the second communication transceiver is equal to or less than a predetermined threshold;
the first signal corresponds to a response request signal that requests a transmission of a response signal to the first communication apparatus;
the second signal corresponds to the response signal responding to the response request signal;
the second controller determines whether a predetermined time elapses after transmission of the second signal by the second controller;
the second controller transmits the second signal from the second communication transceiver to the first communication transceiver when determining that the predetermined time elapses and when the second communication transceiver receives the first signal from the first communication transceiver; and
the second communication transceiver transmits the second signal when the congestion degree of communication in the second communication transceiver is equal to or less than the predetermined threshold.

* * * * *